US012637560B2

(12) United States Patent
Hayes et al.

(10) Patent No.: US 12,637,560 B2
(45) Date of Patent: May 26, 2026

(54) RESIN COMPOSITION

(71) Applicants: ROHM AND HAAS ELECTRONIC MATERIALS LLC, Marlborough, MA (US); DUPONT ELECTRONICS, INC., Wilmington, DE (US)

(72) Inventors: Colin Hayes, Hudson, MA (US); Anton Chavez, West Newton, MA (US); Nora Sabina Radu, Ladenberg, PA (US); Jaclyn Murphy, Ashland, MA (US); Qing Min Wang, North Andover, MA (US); Tao Huang, Stow, MA (US); Anton Li, Marlborough, MA (US); Tanya N. Singh-Rachford, South Grafton, MA (US); Michael Gallagher, Hopkinton, MA (US)

(73) Assignees: Dupont Electronic Materials International, LLC, Marlborough, MA (US); DuPont Electronics, Inc., Wilmington, DE (US)

( * ) Notice: Subject to any disclaimer, the term of this patent is extended or adjusted under 35 U.S.C. 154(b) by 537 days.

(21) Appl. No.: 18/187,201

(22) Filed: Mar. 21, 2023

(65) Prior Publication Data

US 2024/0317985 A1 Sep. 26, 2024

(51) Int. Cl.

| | |
|---|---|
| ***C08L 23/20*** | (2025.01) |
| ***C08K 5/5399*** | (2006.01) |
| ***C08L 77/10*** | (2006.01) |
| ***C08L 79/08*** | (2006.01) |

(52) U.S. Cl.

CPC ............ *C08L 23/20* (2013.01); *C08K 5/5399* (2013.01); *C08L 77/10* (2013.01); *C08L 79/08* (2013.01); *C08L 2203/16* (2013.01)

(58) Field of Classification Search

CPC .... C08F 212/12; C08F 212/22; C08F 212/32; C08F 222/40; C08F 226/02; C08F 236/02; C08F 2438/03; C08F 257/00; C08F 283/04; C08K 5/5399; C08K 7/18; C08K 9/04; C08G 73/1017; C08G 73/1039; C08G 73/1042; C08G 73/1071; C08G 73/12; C08L 2203/16; C08L 23/20; C08L 25/16; C08L 77/10; C08L 79/04; C08L 79/08; C08L 79/085

See application file for complete search history.

(56) References Cited

U.S. PATENT DOCUMENTS

| | | | | |
|---|---|---|---|---|
| 7,198,878 | B2 | 4/2007 | So et al. | |
| 7,892,651 | B2 | 2/2011 | Omori et al. | |
| 8,143,360 | B2 | 3/2012 | So et al. | |
| 9,269,623 | B2 | 2/2016 | Oliver et al. | |
| 9,315,696 | B2 | 4/2016 | Bai et al. | |
| 9,441,055 | B1 | 9/2016 | Romer et al. | |
| 9,909,040 | B2 | 3/2018 | Bai et al. | |
| 10,030,165 | B2 | 7/2018 | Romer et al. | |
| 10,036,952 | B2 | 7/2018 | Malik et al. | |
| 10,113,024 | B2 | 10/2018 | Romer et al. | |
| 10,513,568 | B2 | 12/2019 | Hayes et al. | |
| 11,337,309 | B2 | 5/2022 | Aoude et al. | |
| 11,377,546 | B2 | 7/2022 | Tanigawa et al. | |
| 11,920,023 | B2 | 3/2024 | Hayes et al. | |
| 2007/0225438 | A1* | 9/2007 | Hasegawa ............ | C08G 73/106<br>524/879 |
| 2013/0040517 | A1 | 2/2013 | Oomori et al. | |
| 2016/0300810 | A1* | 10/2016 | Kanamori .......... | C08G 73/1046 |
| 2017/0174805 | A1 | 6/2017 | Romer et al. | |
| 2019/0127505 | A1 | 5/2019 | Hayes et al. | |
| 2019/0127506 | A1 | 5/2019 | Hayes et al. | |
| 2019/0169327 | A1 | 6/2019 | Hayes et al. | |
| 2021/0198389 | A1 | 7/2021 | Hayes et al. | |
| 2021/0198395 | A1 | 7/2021 | Hayes et al. | |
| 2022/0022314 | A1 | 1/2022 | Chen et al. | |
| 2023/0348635 | A1 | 11/2023 | Hayes et al. | |

FOREIGN PATENT DOCUMENTS

| | | | |
|---|---|---|---|
| WO | 2022256951 | A1 | 12/2022 |

* cited by examiner

*Primary Examiner* — Ana L. Woodward

(57) ABSTRACT

There is provided a resin composition from a mixture including: (a) 30-80 weight % of at least one thermosetting resin; and (b) 20-70 weight % of at least one soluble polyimide resin. The resin composition can be used in electronics applications.

14 Claims, No Drawings

RESIN COMPOSITION

FIELD OF THE DISCLOSURE

The present disclosure relates to polymeric resin compositions, methods for preparing such resins, and their use in manufacturing electronic devices.

BACKGROUND INFORMATION

Polymeric resins are used in spin-on dielectric packaging, circuit boards, laminates, coatings on metallic foils, antenna in package, and other electronic applications. The resins need to provide films/coatings having good mechanical properties and good adhesive properties, as well as low dielectric properties. In particular, it is desirable to have high tensile strength, high tensile elongation, high glass transition temperature ($T_g$), low coefficient of thermal expansion (CTE), good adhesion to copper, and low relative permittivity (Dk) and loss tangent (Df) at high frequencies. In addition, it is desirable to be able to cure the resins at lower temperatures without excessive cure times.

There is a continuing need for dielectric resin compositions which have improved properties for use in these applications.

DETAILED DESCRIPTION

As used throughout this specification, the following abbreviations shall have the following meanings, unless the context clearly indicates otherwise: ° C.=degree Celsius; g=gram; nm=nanometer, µm=micron=micrometer; mm=millimeter; sec.=second; and min.=minutes. All amounts are percent by weight ("Weight %" or "wt. %") and all ratios are molar ratios, unless otherwise noted. All numerical ranges are inclusive and combinable in any order, except where it is clear that such numerical ranges are constrained to added up to 100%. Unless otherwise noted, all polymer and oligomer molecular weights are weight average molecular weights ('Mw") with unit of g/mol or Dalton and are determined using gel permeation chromatography compared to polystyrene standards.

The articles "a", "an" and "the" refer to the singular and the plural, unless the context clearly indicates otherwise. As used herein, the term "and/or" includes any and all combinations of one or more of the associated items.

As used in herein, R, $R^a$, $R^b$, R', R" and any other variables are generic designations and may be the same as or different from those defined in the formulas.

As used herein, the term "addition polymerizable" as it applies to monomers, is intended to mean unsaturated monomers that are capable of polymerization by the simple linking of groups without the co-generation of other products.

The term "adjacent" as it refers to substituent groups that are bonded to carbons that are joined together with a single or multiple bond. Exemplary adjacent R groups are shown below:

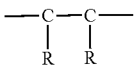

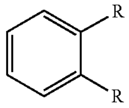

The term "alkoxy" is intended to mean the group RO—, where R is an alkyl group.

The term "alkyl" is intended to mean a group derived from an aliphatic hydrocarbon and includes a linear, a branched, or a cyclic group. A group "derived from" a compound, indicates the radical formed by removal of one or more hydrogen or deuterium. In some embodiments, an alkyl has from 1 to 20 carbon atoms.

The term "amine" is intended to mean a compound that contains a basic nitrogen atom with a lone pair, where lone pair refers to a set of two valence electrons that are not shared with another atom. The term "amino" refers to the functional group —$NH_2$, —NHR, or —$NR_2$, where R is the same or different at each occurrence and can be an alkyl group or an aryl group. The term "diamine" is intended to mean a compound that contains two basic nitrogen atoms with associated lone pairs. The term "polyamine" is intended to mean a compound that contains two or more basic nitrogen atoms with associated lone pairs. The term "aromatic diamine" is intended to mean an aromatic compound having two amino groups. The term "aromatic polyamine" is intended to mean an aromatic compound having two or more amino groups. The term "bent diamine" is intended to mean a diamine wherein the two basic nitrogen atoms and associated lone pairs are asymmetrically disposed about the center of symmetry of the corresponding compound or functional group, e.g. m-phenylenediamine:

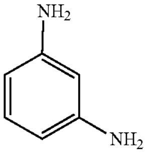

The term "aromatic diamine residue" is intended to mean the moiety bonded to the two amino groups in an aromatic diamine. The term "aromatic polyamine residue" is intended to mean the moiety bonded to the two or more amino groups in an aromatic polyamine. The term "aromatic diisocyanate residue" is intended to mean the moiety bonded to the two isocyanate groups in an aromatic diisocyanate compound. The term "aromatic polyisocyanate residue" is intended to mean the moiety bonded to the two or more isocyanate groups in an aromatic polyisocyanate compound. This is further illustrated below.

| Polyamine/Polyisocyanate | Residue |
| --- | --- |
| 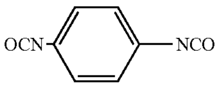 | 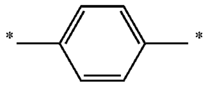 |

-continued

| Polyamine/Polyisocyanate | Residue |
|---|---|
| 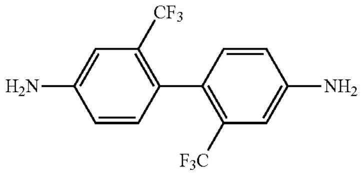 [SMILES: Nc1ccc(-c2ccc(N)cc2C(F)(F)F)c(C(F)(F)F)c1] | 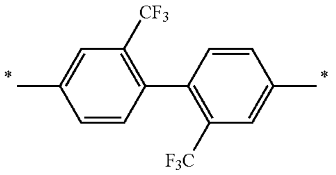 |
| 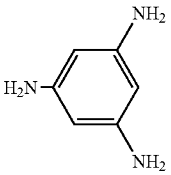 | 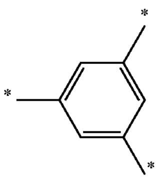 |

The terms "diamine residue" and "diisocyanate residue" are intended to mean the moiety bonded to two amino groups or two isocyanate groups, respectively, where the moiety is aliphatic or aromatic. The terms "polyamine residue" and "polyisocyanate residue" are intended to mean the moiety bonded to two or more amino groups or two or more isocyanate groups, respectively, where the moiety is aliphatic or aromatic.

The term "aromatic compound" is intended to mean an organic compound comprising at least one unsaturated cyclic group having 4n+2 delocalized pi electrons.

The term "aryl" is intended to mean a group derived from an aromatic compound having one or more points of attachment. The term includes groups which have a single ring and those which have multiple rings which can be joined by a single bond or fused together. Carbocyclic aryl groups have only carbons in a ring structure. Heteroaryl groups have at least one heteroatom in a ring structure.

The term "alkylaryl" is intended to mean an aryl group having one or more alkyl substituents.

The term "aryloxy" is intended to mean the group RO—, where R is an aryl group.

The term "crosslinking group" refers to a functional group containing a bond or a short sequence of bonds that are used to connect one polymer chain to another.

The term "curable" as it applies to a composition, is intended to mean a material that becomes harder and less soluble in solvents when exposed to radiation and/or heat, or under the conditions of use.

The term "endcapping compound" refers to a discreet compound or group used in a resin to inhibit ongoing polymerization and thereby control the overall resin molecular weight.

The term "liquid composition" is intended to mean a liquid medium in which a material is dissolved to form a solution, a liquid medium in which a material is dispersed to form a dispersion, or a liquid medium in which a material is suspended to form a suspension or an emulsion.

The term "(meth)acrylate" is intended to mean a group which is either an acrylate or a methacrylate.

The term "polyimide" refers to condensation polymers resulting from the reaction of one or more polyfunctional anhydride components with one or more primary polyamines or polyisocyanates. They contain the imide structure —CO—NR—CO—as a linear or heterocyclic unit along the main chain of the polymer backbone.

The term "Reversible Addition Fragmentation chain Transfer (RAFT) Agent" is intended to mean a monomer or compound used to control the molecular weight and molecular weight distribution of a free radical polymerization so as to allow for the preparation of polymers with well-defined architecture and predictable functionality.

The term "semiconductor wafer" is intended to encompass a semiconductor substrate, a semiconductor device, and various packages for various levels of interconnection, including a single-chip wafer, multiple-chip wafer, packages for various levels, substrates for light emitting diodes (LEDs), or other assemblies requiring solder connections. Semiconductor wafers, such as silicon wafers, gallium-arsenide wafers, and silicon-germanium wafers, may be patterned or unpatterned. As used herein, the term "semiconductor substrate" includes any substrate having one or more semiconductor layers or structures which include active or operable portions of semiconductor devices. The term "semiconductor substrate" is defined to mean any construction comprising semiconductive material, such as a semiconductor device. A "semiconductor device" refers to a semiconductor substrate upon which at least one microelectronic device has been or is being fabricated. Thermally stable polymers include, without limitation, any polymer stable to the temperatures used to cure the arylcyclobutene material, such as polyimide, for example, KAPTON™ polyimide (DuPont, Wilmington, DE), liquid crystalline polymers, for example VECSTAR™ LCP film (Kuraray, Tokyo, Japan) and Bismaleimide-Triazine (BT) resins (MGC, Tokyo, Japan). Additional polymeric substrates can include polyolefins such as polyethylene, polypropylene and polyvinyl chloride; a film of polyester such as polyethylene terephthalate (hereinafter may be abbreviated as "PET") and polyethylene naphthalate, or a polycarbonate film. Further, a release paper, a metal foil such as a copper foil and an aluminum foil, and the like, can be used. The support and a protective film to be described later may be subjected to a surface treatment such as a mat treatment and a corona treatment. Alternatively, the support and the protective film may be subjected to a release treatment with a release agent such as a silicone resin-based release agent, an alkyd resin-based release agent, or a fluororesin-based release agent. In some non-limiting embodiments; the support has a thickness of 10-150 μm, and in some non-limiting embodiments 25-50 μm.

The term "solvent" is intended to mean an organic compound that is a liquid at the temperature of use. The term is intended to encompass a single organic compound or mixture of two or more organic compounds.

The term "tetracarboxylic acid component" is intended to mean any one or more of the following: a tetracarboxylic acid, a tetracarboxylic acid monohydride, a tetracarboxylic acid dianhydride, a tetracarboxylic acid monoester, and a tetracarboxylic acid diester.

The term "tetracarboxylic acid component residue" is intended to mean the moiety bonded to the four carboxy groups in a tetracarboxylic acid component. This is further illustrated below.

| Tetracarboxylic acid component | Residue |
| --- | --- |
| 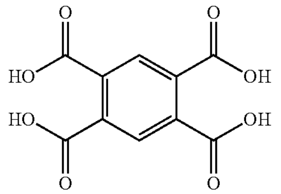 [SMILES: O=C(O)c1cc(C(=O)O)c(C(=O)O)cc1C(=O)O] | 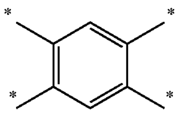 |
| 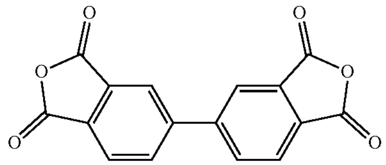 [SMILES: O=C1OC(=O)c2cc(-c3ccc4c(c3)C(=O)OC4=O)ccc21] | 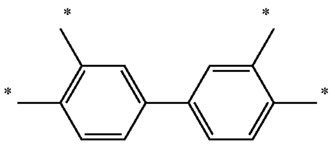 |
| 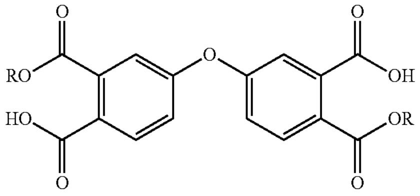 | 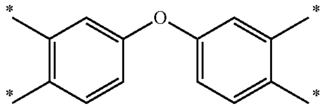 |

The term "thermosetting resin" is intended to refer to a polymer or material that is irreversibly crosslinked or has experienced an irreversible growth in network molecular weight such that the polymer or material cannot be substantially reshaped after this process.

The terms "film" and "layer" are used interchangeably through this specification.

All ranges are inclusive and combinable. For example, the term "a range of 50 to 3000 cPs, or 100 or more cPs" would include each of 50 to 100 cPs, 50 to 3000 cPs and 100 to 3000 cPs.

In this specification, unless explicitly stated otherwise or indicated to the contrary by the context of usage, where an embodiment of the subject matter hereof is stated or described as comprising, including, containing, having, being composed of or being constituted by or of certain features or elements, one or more features or elements in addition to those explicitly stated or described may be present in the embodiment. An alternative embodiment of the disclosed subject matter hereof is described as consisting essentially of certain features or elements in which embodiment features or elements that would materially alter the principle of operation or the distinguishing characteristics of the embodiment are not present therein. A further alternative embodiment of the described subject matter hereof is described as consisting of certain features or elements in which embodiment, or in insubstantial variations thereof, only the features or elements specifically stated or described are present.

Unless otherwise defined, all technical and scientific terms used herein have the same meaning as commonly understood by one of ordinary skill in the art to which this disclosure belongs. Although methods and materials similar or equivalent to those described herein can be used in the practice or testing of embodiments of the present disclosure, suitable methods and materials are described below. In addition, the materials, methods, and examples are illustrative only and not intended to be limiting.

To the extent not described herein, many details regarding specific materials, processing acts, and circuits are conventional and may be found in textbooks and other sources within the photoresist, dielectric materials, and semiconductive member arts.

There is provided a resin composition from a mixture comprising: (a) 30-80 weight % of at least one thermosetting resin; and (b) 20-70 weight % of at least one soluble polyimide resin.

The at least one thermosetting resin is not particularly limited and is selected from the group consisting of arylcyclobutenes, vinyl radical cured polymers, bismaleimide thermosets, epoxy thermosets, and thermosets cured by Michael Addition. In some non-limiting embodiments, the at least one thermosetting resin is an arylcyclobutene.

The at least one arylcyclobutene resin contains a polymerization product from a mixture comprising (a) 10-50 mol % of one or more addition polymerizable arylcyclobutene monomers and one or more monomers selected from the group consisting of: (b) 15-60 mol % of one or more dienophile monomers; (c) 0-50 mol % of one or more diene monomers; (d) 0-20 mol % of one or more Reversible Addition Fragmentation chain Transfer (RAFT) Agents; and (e) 0-10 mol % of one or more heterocycle containing monomers.

The at least one arylcyclobutene resin is prepared from an addition polymerizable arylcyclobutene monomer that is an arylcyclobutene having at least one addition polymerizable substituent. The substituent can be a vinyl group, an allyl group, or a (meth)acrylate group. The monomer can be present in an amount of 5-60 mol %, or in some non-limiting embodiments 10-50 mol %, or in some non-limiting embodiments 20-40 mol %, or in some non-limiting embodiments 25-35 mol %, based on the total monomers present in the copolymerization.

In some embodiments, the arylcyclobutene monomer has Formula A-1, Formula A-2, or Formula A-3, shown below:

(A-1)

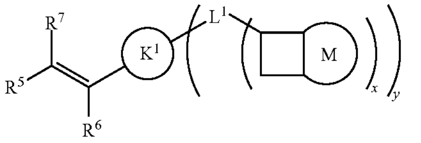

(A-2)

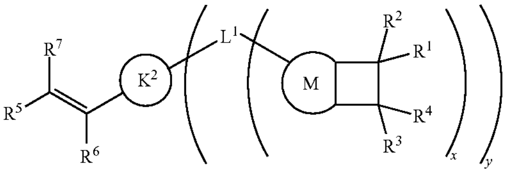

(A-3)

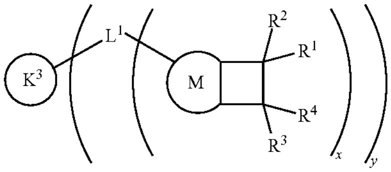

In Formula A-1, $K^1$ can be a divalent group selected from the group consisting of alkyl, aryl, carbocyclic aryl, polycyclic aryl, heteroaryl, aryloxy, arylalkyl, carbonyl, ester, carboxyl, ether, thioester, thioether, tertiary amine, and combinations thereof. In some non-limiting embodiments, $K^1$ can be an unsubstituted $C_{6-36}$ carbocyclic aryl group having no heteroatoms, or an unsubstituted $C_{6-18}$ carbocyclic aryl group having no heteroatoms; or a substituted $C_{6-36}$ carbocyclic aryl group having at least one substituent selected from the group consisting of alkyl and alkoxy, or a substituted $C_{6-18}$ carbocyclic aryl group having at least one substituent selected from the group consisting of alkyl and alkoxy; or an unsubstituted $C_{3-36}$ heteroaryl group, or an unsubstituted $C_{3-18}$ heteroaryl group; or an substituted $C_{6-36}$ heteroaryl group having at least one substituent selected from the group consisting of alkyl and alkoxy, or a substituted $C_{6-18}$ heteroaryl group having at least one substituent selected from the group consisting of alkyl and alkoxy; or a unsubstituted $C_{6-36}$ aryloxy group having no ring heteroatoms, or an unsubstituted $C_{6-18}$ aryloxy group having no ring heteroatoms; or a substituted $C_{3-36}$ heteroaryloxy group having at least one substituent selected from the group consisting of alkyl and alkoxy, or a substituted $C_{3-18}$ heteroaryloxy group having at least one substituent selected from the group consisting of alkyl and alkoxy; or an unsubstituted $C_{6-36}$ arylalkyl group having no heteroatoms, or an unsubstituted $C_{6-18}$ arylalkyl group having no heteroatoms; or a substituted $C_{3-36}$ heteroarylalkyl group having at least one substituent selected from the group consisting of alkyl and alkoxy, or a substituted $C_{3-18}$ heteroarylalkyl group having at least one substituent selected from the group consisting of alkyl and alkoxy.

In Formula A-1, $L^1$ is a covalent bond or a multivalent linking group. In some non-limiting embodiments, $L^1$ is a $C_{6-12}$ carbocyclic aryl group having no ring heteroatoms or is selected from the group consisting of phenyl, biphenyl, and naphthyl.

In Formula A-1, M is a substituted or unsubstituted divalent aromatic or polyaromatic radical group, or a substituted or unsubstituted divalent heteroaromatic or polyheteroaromatic radical group. In some non-limiting embodiments of Formula A-1, M is an unsubstituted $C_{6-36}$ carbocyclic aryl group having no heteroatoms, or an unsubstituted $C_{6-18}$ carbocyclic aryl group having no heteroatoms; or a substituted $C_{6-36}$ carbocyclic aryl group having at least one substituent selected from the group consisting of alkyl and alkoxy, or a substituted $C_{6-18}$ carbocyclic aryl group having at least one substituent selected from the group consisting of alkyl and alkoxy; or an unsubstituted $C_{3-36}$ heteroaryl group, or an unsubstituted $C_{3-18}$ heteroaryl group; or a substituted $C_{6-36}$ heteroaryl group having at least one substituent selected from the group consisting of alkyl and alkoxy, or a substituted $C_{6-18}$ heteroaryl group having at least one substituent selected from the group consisting of alkyl and alkoxy.

In Formula A-1, $R^5$ is selected from the group consisting of hydrogen, substituted or unsubstituted alkyl, substituted or unsubstituted alkyloxy, substituted or unsubstituted aryl, substituted or unsubstituted aryloxy, alkylthio, arylthiol, substituted alkyl amino, and substituted aryl amino. In some non-limiting embodiments of Formula A-1, $R^5$ is hydrogen; or a $C_{1-6}$ alkyl, or a $C_{1-3}$ alkyl; or a $C_{1-6}$ alkoxy, or a $C_{1-3}$ alkoxy.

In Formula A-1, $R^6$ and $R^7$ are the same or different and are independently selected from the group consisting of hydrogen, deuterium, cyano, halo, methyl, vinyl, allyl, and a substituted or unsubstituted isoprene having 1-100 carbon atoms.

In some non-limiting embodiments of Formula A-1, $R^5$=$R^6$=$R^7$=hydrogen.

In some non-limiting embodiments of Formula A-1, x and y are the same or different and are an integer from 1 to 5, wherein when $L^1$ is a covalent bond, y=1.

In Formula A-2, $K^2$ can be a single bond or a divalent group selected from the group consisting of alkyl, aryl, carbocyclic aryl, polycyclic aryl, heteroaryl, aryloxy, arylalkyl, carbonyl, ester, carboxyl, and ether, thioester, thioether, tertiary amine, and combinations thereof. In some non-limiting embodiments, $K^2$ can be a covalent bond; or an unsubstituted $C_{6-36}$ carbocyclic aryl group having no heteroatoms, or an unsubstituted $C_{6-18}$ carbocyclic aryl group having no heteroatoms; or an substituted $C_{6-36}$ carbocyclic aryl group having at least one substituent selected from the group consisting of alkyl and alkoxy, or a substituted $C_{6-18}$ carbocyclic aryl group having at least one substituent selected from the group consisting of alkyl and alkoxy; or an unsubstituted $C_{3-36}$ heteroaryl group, or an unsubstituted $C_{3-18}$ heteroaryl; or a substituted $C_{6-36}$ heteroaryl group having at least one substituent selected from the group consisting of alkyl and alkoxy, or a substituted $C_{6-18}$ heteroaryl group having at least one substituent selected from the group consisting of alkyl and alkoxy; or a unsubstituted $C_{6-36}$ aryloxy group having no ring heteroatoms, or an unsubstituted $C_{6-18}$ aryloxy group having no ring heteroatoms; or a substituted $C_{3-36}$ heteroaryloxy group having at least one substituent selected from the group consisting of alkyl and alkoxy, or a substituted $C_{3-18}$ heteroaryloxy group having at least one substituent selected from the group consisting of alkyl and alkoxy; or an unsubstituted $C_{6-36}$ arylalkyl group having no heteroatoms, or an unsubstituted $C_{6-18}$ arylalkyl group having no heteroatoms; or a substituted $C_{3-36}$ heteroarylalkyl group having at least one substituent selected from the group consisting of alkyl and alkoxy, or a substituted $C_{3-18}$ heteroarylalkyl group having at least one substituent selected from the group consisting of alkyl and alkoxy.

$L^1$, M, x, and y in Formula A-1 apply equally to $L^1$, M, x, and y in Formula A-2. All of the above-described embodiments for $R^5$ in Formula A-1 apply equally to $R^1$-$R^7$ in Formula A-2.

In Formula A-3, $K^3$ is a polymerizable functional group selected from the group consisting of vinyl, styryl, maleimide, acrylic, methacrylic, allylic, alkynyl or the functional equivalent.

$L^1$, M, x, and y in Formula A-1 and Formula A-2, apply equally to $L^1$, M, x, and y in Formula A-3. All of the above-described embodiments for $R^1$-$R^4$ in Formula A-1 and Formula A-2 apply equally to $R^1$-$R^4$ in Formula A-3.

In one non-limiting embodiment, the arylcyclobutene monomer has Formula A-1-a:

(A-1-a)

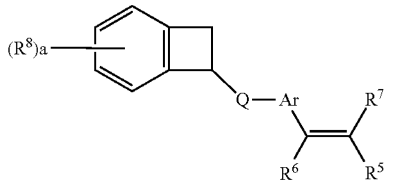

where Ar is a substituted or unsubstituted carbocyclic aryl or a substituted or unsubstituted heteroaryl group; Q is a covalent bond, O, S, or $NR^a$; $R^a$ is selected from the group consisting of hydrogen, deuterium, substituted or unsubstituted carbocyclic aryl, and substituted or unsubstituted heteroaryl; $R^5$-$R^7$ are the same or different and are independently selected from the group consisting of hydrogen, deuterium, alkyl, alkoxy, a substituted or unsubstituted carbocyclic aryl group, and a substituted or unsubstituted heteroaryl group; $R^8$ is selected from the group consisting of alkyl, alkoxy, a substituted or unsubstituted carbocyclic aryl group, and a substituted or unsubstituted heteroaryl group; and a is an integer from 0 to 4.

In Formula A-1-a, Ar is an unsubstituted carbocyclic aryl group having 6-36 ring carbons, or an unsubstituted carbocyclic aryl group having 6-12 ring carbons; or a substituted carbocyclic aryl group having 6-36 ring carbons and having at least one substituent selected from the group consisting of alkyl and alkoxy, or a substituted carbocyclic aryl group having 6-12 ring carbons and having at least one substituent selected from the group consisting of alkyl and alkoxy; or heteroaryl group having 3-36 ring carbons, or heteroaryl group having 3-12 ring carbons; or a substituted heteroaryl group having 6-36 ring carbons and having at least one substituent selected from the group consisting of alkyl and alkoxy, or a substituted heteroaryl group 3-12 ring carbons and having at least one substituent selected from the group consisting of alkyl and alkoxy; or selected from the group consisting of phenyl, biphenyl, and naphthyl.

In some non-limiting embodiments of Formula A-1-a, Q is a covalent bond, or O, or S, or NH, or $NCH_3$.

In some non-limiting embodiments of Formula A-1-a, a is 0; or 1; or 2; or >0; or >0 and at least one $R^8$ is a $C_{1-6}$ alkyl, or $C_{1-3}$ alkyl; or >0 and at least one $R^8$ is a $C_{1-6}$ alkoxy, or $C_{1-3}$ alkoxy.

In another non-limiting embodiment, the arylcyclobutene monomer has Formula A-2-a:

(A-2-a)

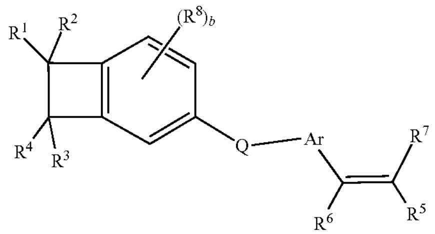

where Ar is a substituted or unsubstituted carbocyclic aryl or a substituted or unsubstituted heteroaryl group; Q is a covalent bond, O, S, or $NR^a$; $R^a$ is selected from the group consisting of hydrogen, deuterium, substituted or unsubstituted carbocyclic aryl, and substituted or unsubstituted heteroaryl; $R^1$-$R^7$ are the same or different and are independently selected from the group consisting of hydrogen, deuterium, alkyl, alkoxy, aryloxy, a substituted or unsubstituted carbocyclic aryl group, and a substituted or unsubstituted heteroaryl group; $R^8$ is selected from the group consisting of alkyl, alkoxy, a substituted or unsubstituted carbocyclic aryl group, and a substituted or unsubstituted heteroaryl group; and b is an integer from 0 to 3.

In Formula A-2-a, b can be 0; or 1; or 2; or >0; or >0 and at least one $R^8$ is a $C_{1-6}$ alkyl, or $C_{1-3}$ alkyl; >0 and at least one $R^8$ is a $C_{1-6}$ alkoxy, or $C_{1-3}$ alkoxy.

All of the above-described embodiments for Ar and Q in Formula A-1-a, apply equally to Ar and Q in Formula A-2-a. All of the above-described embodiments for $R^5$ in Formula A-1, apply equally to $R^1$-$R^7$ in Formula A-2-a.

Examples of the arylcyclobutene monomer can include, but are not limited to, 1-(4-vinyl phenoxy)-benzocyclobutene, 1-(4-vinyl methoxy)-benzocyclobutene, 1-(4-vinyl phenyl)-benzocyclobutene, 1-(4-vinyl hydroxynaphthyl)-benzocyclobutene, 4-vinyl-1-methyl-benzocyclobutene, 4-vinyl-1-methoxy-benzocyclobutene, and 4-vinyl-1-phenoxy-benzocyclobutene.

The arylcyclobutene resin is prepared from one or more dienophile monomers present in an amount of 5-70 mol %, or in some embodiments 15-60 mol %, or in some embodiments 25-45 mol %, based on the total monomers present in the copolymerization having a structure given by Formula (II):

(II)

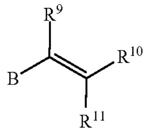

In Formula (II) B can be hydrogen, substituted or unsubstituted alkyl, substituted or unsubstituted aryl, substituted or unsubstituted heteroaryl, substituted or unsubstituted alkyloxy, or hydroxy. $R^9$-$R^{11}$ are the same or different and are independently selected from the group consisting of hydrogen, deuterium, methyl, vinyl, allyl, substituted or unsubstituted isoprene having 1-100 carbon atoms, substituted or unsubstituted alkyl having 1 to 100 carbon atoms, halogen, cyano, substituted or unsubstituted aryl having 6 to 100 carbon atoms, substituted or unsubstituted heteroaryl having 6 to 100 carbon atoms, and combinations thereof.

In some non-limiting embodiments, the one or more dienophile monomers has a structure given by Formula (III)

(III)

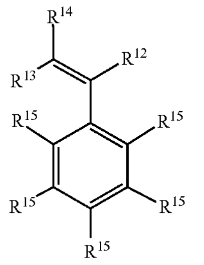

where $R^{12}$-$R^{14}$ are the same or different and are independently selected from the group consisting of hydrogen and $C_{1-5}$ alkyl; and $R^{15}$ is the same or different at each occurrence and is selected from the group consisting of hydrogen and $C_{1-5}$ alkyl, and wherein adjacent $R^{15}$ groups can be joined to form a fused 6-membered aromatic ring.

In some non-limiting embodiments, the one or more dienophile monomers is selected from the group consisting of styrene, α-methylstyrene, vinyl toluene, 1-vinylnaphthalene, and 2-vinylnaphthalene.

The diene monomer can be present in an amount of 0-60 mol %, 0-50 mol %, 10-40 mol %, or 20-30 mol % based on the total monomers present in the copolymerization. In one embodiment, the diene monomer has Formula (IV), as shown below:

(IV)

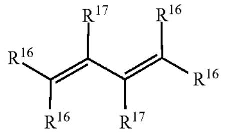

where $R^{16}$ is the same or different at each occurrence and is selected from the group consisting of hydrogen and methyl; and $R^{17}$ is the same or different at each occurrence and is selected from the group consisting of hydrogen, $C_{1-5}$ alkyl, $C_{1-5}$ alkoxy, $C_{1-5}$ thioalkyl, and $C_{5-12}$ alkenyl.

In Formula IV, all $R^{16}$ can be hydrogen, or three $R^{16}$ are hydrogen and one $R^{16}$ is methyl. The two $R^{17}$ are the same; or different; or at least one $R^{17}$ is hydrogen; or at least one $R^{17}$ is a $C_{1-3}$ alkyl, or methyl; or at least one $R^{17}$ is a $C_{1-3}$ alkoxy, or methoxy; or at least one $R^{17}$ is an alkenyl having the formula $—(CH_2)_c—CH═C(R^{18})_2$, where c is an integer of 1-5 and $R^{18}$ is hydrogen or methyl.

Examples of the diene monomers can include, but are not limited to, butadiene, isoprene, 1,3-pentadiene, 2,4-hexadiene, cyclopentadiene, β-myrcene, ocimene, cyclooctadiene, farnesene, and polymerizable terpenes.

The one or more Reversible Addition Fragmentation chain Transfer (RAFT) Agents can be present in an amount of 0-40 mol %, 0-30 mol %, 0-20 mol %, 2-18 mol %, or 5-15 mol % based on the total monomers present in the copolymerization. Any number of a wide variety of RAFT Agents may be used in the resin compositions disclosed herein—they should be capable of initiating the polymerization of the other resin components while achieving a narrow polydispersity in the process. For a RAFT polymerization to be efficient, the initial RAFT agent generally comprises a reactive C═S double bond; the intermediate radical should fragment rapidly without side reactions; the intermediate should partition in favor of products, and the expelled radicals should efficiently re-initiate polymerization. In some non-limiting embodiments, the RAFT agent is a thiocarbonylthio compound having Formula (V):

(V)

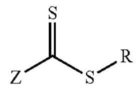

where R is free radical leaving group and Z is a group that modifies addition and fragmentation rates of RAFT polymerization. Exemplary RAFT Agents include, but are not limited to, a dithioester compound (where Z=aryl, heteroaryl, or alkyl), a trithiocarbonate compound (where Z=alkylthio, arylthio, or heteroarylthio), a dithiocarbamate compound (where Z=arylamine or heteroarylamine or alkylamine), and a xantate compound (where Z=alkoxy, aryloxy, or heteroaryloxy), that are capable or reversible association with polymerizable free radicals. In other embodiments, Z can also be sulfonyl, phosphonate, or phosphine.

In some non-limiting embodiments, the one or more Reversible Addition Fragmentation chain Transfer (RAFT) Agents is selected from the group consisting of thiocarbonylthio compounds, dithioester compounds, trithiocarbonate compounds, dithiocarbamate compounds, and xanthate compounds that are capable of reversible association with polymerizable free radicals.

In some non-limiting embodiments, the one or more Reversible Addition Fragmentation chain Transfer (RAFT) Agents is selected from the group consisting of 1-phenylethyl benzodithioate, 1-phenylethyl 2-phenylpropanedithioate, and dibenzyl trithiocarbonate.

The mixture can further comprise 0-20 mol %, or 0-15 mol %, or 0-10 mol %, or 2-8 mol % of an addition polymerizable vinyl-substituted $C_{3-12}$ heterocycle or a vinyl-substituted $C_{3-5}$ heterocycle monomer. In some embodiments, the heterocycle monomer can be further substituted with one or more $C_{1-6}$ alkyl, a $C_{6-12}$ carbocyclic aryl, or a $C_{3-12}$ heteroaryl. The heterocycle monomer is selected from the group consisting of N-heterocycles, S-heterocycles, N,S-heterocycles, and substituted derivatives thereof.

The N-heterocycle can have at least one ring nitrogen. Examples of N-heterocycles can include, but are not limited to, pyrrole, pyridine, diazines, triazines, imidazoles, benzoimidazoles, and quinolones. The S-heterocycle can have at least one ring sulfur. Examples of S-heterocycles can include, but are not limited to, thiophene, benzothiophene, and dibenzothiophene. The N,S-heterocycle can have at least one ring nitrogen and one ring sulfur. Examples of N,S-heterocycles can include, but are not limited to thiazole, thiadiazole, and thiadiazine.

In one non-limiting embodiment, the heterocycle monomer has Formula (VI), shown below:

(VI)

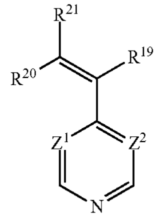

where $Z^1$ and $Z^2$ are the same or different and are N or $CR^{22a}$; and $R^{19}$-$R^{21}$ and $R^{22a}$ are the same or different at each occurrence and are selected from the group consisting of hydrogen and $C_{1-5}$ alkyl.

In Formula VI, $Z^1$=$Z^2$; or $Z^1 \neq Z^2$; or $Z^1$ is CH, or $CR^{22a}$, or N, or CH; or $Z^2$ is $CR^{22a}$, or N. $R^{19}$ is hydrogen, or a $C_{1-3}$ alkyl, or methyl. All of the above-described embodiments for $R^{19}$ in Formula V apply equally to $R^{20}$, $R^{21}$, and $R^{22a}$ in Formula V; or $R^{19}$=$R^{20}$=$R^{21}$=hydrogen.

Examples of the heterocycle monomers can include, but are not limited to, 4-vinyl pyridine, 4-vinyl-1,3-diazine, 2-vinyl-1,3,5-triazine, and 4-methyl-5-vinyl-1,3-thiazole. Furthermore, one or more additional addition polymerizable monomers can be present in the polymerization.

In some non-limiting embodiments, the at least one arylcyclobutene resin has a structure given by Formula (VII)

(VII)

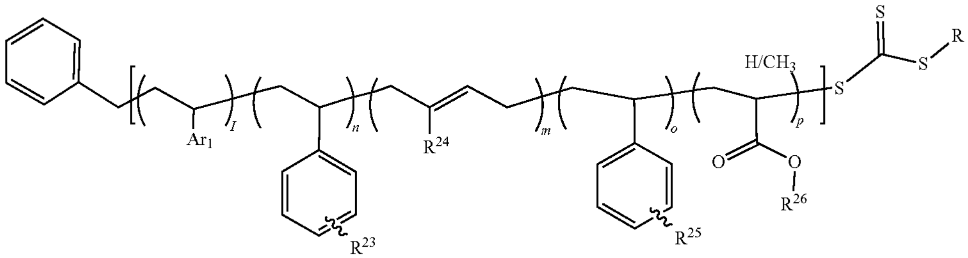

where R is a free radical leaving group, $Ar_1$ is a heterocycle containing an N, S, O or P atom; $R^{23}$ is H, $CH_3$, ethyl or t-butyl; $R^{24}$ is H, $CH_3$, $C_1$-$C_{12}$ alkyl or $C_1$-$C_{12}$ alkene; $R^{25}$ is cyclobutene, 1-oxy-cyclobutene, or α-methyl cyclobutene; 1 is an integer of 0 to 10; $R^{26}$ is an alkyl group of 1 to 12 carbon atoms, a cycloalkyl group, or an aryl group; n is an integer of 5 to 70; m is an integer of 0 to 50; and o is an integer of 5 to 50; and p is an integer of 0 to 50; where l, m, n, o, and p are mole fractions of the respective monomer units.

The at least one soluble polyimide resin can be present in an amount from 10-80 mol %, or in some embodiments 20-70 mol %, or in some embodiments 30-60 mol %, or in some embodiments 40-50 mol % based on the total amount of resin present in the resin composition. The at least one soluble polyimide resin contains: (a) one or more tetracarboxylic acid component residues; (b) one or more diamine component residues; and (c) one or more endcapping compounds; wherein: the one or more endcapping compounds comprise one or more crosslinking groups.

The one or more tetracarboxylic acid component residues are not particularly limited and are derived from the corresponding tetracarboxylic acid dianhydrides selected from the group consisting of aromatic tetracarboxylic acid dianhydrides and aliphatic tetracarboxylic acid dianhydrides.

In some non-limiting embodiments, the aromatic tetracarboxylic acid dianhydrides are selected from the group consisting of 4,4'-(hexafluoro-isopropylidene) diphthalic anhydride (6FDA); 4,4'-oxydiphthalic dianhydride (ODPA); pyromellitic dianhydride (PMDA); 3,3',4,4'-biphenyltetracarboxylic dianhydride (BPDA); 2,3,3',4'-biphenyltetracarboxylic dianhydride (s-BDA); asymmetric 2,3,3',4'-biphenyl-tetracarboxylic dianhydride (a-BPDA); 3,3',4,4'-benzophenone tetracarboxylic dianhydride (BTDA); 3,3',4,4'-diphenylsulfone tetracarboxylic dianhydrides (DSDA); 4-(2,5-dioxotetrahydrofuran-3-yl)-1,2,3,4-tetrahydronaphtalene-1,2-dicarboxylic anhydride (DTDA); decahydro-5-(tetrahydro-2,5-dioxo-3-furanyl)naphtho[1,2-c]furan-1,3-dione; hexahydro-4,9-methano-3H-furo[3,4-g][2]benzopyran-1,3,5,7(3aH)-tetrone; 3,3',4,4'-bicyclohexyltetracarboxylic dianhydride; hexahydro-4,8-methano-1H,3H-benzo[1,2-c:4,5-c']difuran-1,3,5,7-tetrone; hexahydro-1H,3H-benzo[1,2-c:4,5-c']difuran-1,3,5,7-tetrone; 3,3'4,4'-diphenylsulfone tetracarboxylic dianhydride (DSDA); ethylene glycol bis(trimellitic anhydride); 4,4'-bisphenol A dianhydride (BPADA); and the like.

In some non-limiting embodiments, the aromatic tetracarboxylic acid dianhydrides may be further substituted with functional groups selected from the group consisting of alkyl; aryl; nitro; cyano; —N(R')(R"); halo; hydroxy; carboxy; alkenyl; alkynyl; cycloalkyl; heteroaryl; alkoxy; aryloxy; heteroaryloxy; alkoxycarbonyl; perfluoroalkyl; perfluoroalkoxy; arylalkyl; silyl; siloxy; siloxane; thioalkoxy; $—S(O)_2—$; —C(=O)—N(R')(R"); (R')(R")N-alkyl; (R')(R")N-alkoxyalkyl; (R')(R")N-alkylaryloxyalkyl; $—S(O)_s$-aryl; and $—S(O)_s$-heteroaryl; and other group capable of forming new C—C or C-heteroatom bonds during the curing process; and wherein: R' and R" are the same or different at each occurrence and are an optionally substituted alkyl, cycloalkyl, or aryl group; $0 \leq S \leq 2$; and the functional groups optionally contain crosslinking groups.

In some non-limiting embodiments, the aliphatic tetracarboxylic acid dianhydrides are selected from the group consisting of cyclobutane dianhydride (CBDA); 3-(carboxymethyl)-1,2,4-cyclopentanetricarboxylic acid 1,4:2,3-dianhydride; bicyclo[2.2.2]oct-7-ene-2,3,5,6-tetracarboxylic dianhydride; 1,2,3,4-cyclopentanetetracarboxylic dianhydride; 1,2,4,5-cyclohexane-tetracarboxylic dianhydride; 1,2,3,4-tetramethyl-1,2,3,4-cyclobutanetetracarboxylic dianhydride; 1,3-dimethyl-1,2,3,4-cyclobutane-tetracarboxylic acid dianhydride; tricyclo-[6.4.0.02,7]dodecane-1,8:2,7-tetracarboxylic dianhydride; meso-butane-1,2,3,4-tetracarboxylic dianhydride; 4-(2,5-dioxotetrahydrofuran-3-yl)-1,2,3,4-tetrahydronaphthalene-1,2-dicarboxylic anhydride; 5-(2,5-dioxotetrahydrofuryl)-3-methyl-3-cyclohexene-1,2-dicarboxylic anhydride; and the like.

In some non-limiting embodiments, the aliphatic tetracarboxylic acid dianhydrides may be further substituted with functional groups selected from the group consisting of alkyl; aryl; nitro; cyano; —N(R')(R"); halo; hydroxy; carboxy; alkenyl; alkynyl; cycloalkyl; heteroaryl; alkoxy; aryloxy; heteroaryloxy; alkoxycarbonyl; perfluoroalkyl; perfluoroalkoxy; arylalkyl; silyl; siloxy; siloxane; thioalkoxy; —$S(O)_2$—; —C(═O)—N(R')(R"); (R')(R")N-alkyl; (R')(R")N-alkoxyalkyl; (R')(R")N-alkylaryloxyalkyl; —$S(O)_s$-aryl; and —$S(O)_s$-heteroaryl; and other group capable of forming new C—C or C-heteroatom bonds during the curing process; and wherein: R' and R" are the same or different at each occurrence and are an optionally substituted alkyl, cycloalkyl, or aryl group; 0≤S≤2; and the functional groups optionally contain crosslinking groups.

The one or more diamine component residues are not particularly limited and are derived from the corresponding diamines selected from the group consisting of aromatic diamines and aliphatic diamines.

In some non-limiting embodiments, the aromatic diamines are selected from the group consisting of p-phenylenediamine (PPD); 2,2'-bis(trifluoromethyl) benzidine (TFMB); m-phenylenediamine (MPD); 4,4'-oxydianiline (4,4'-ODA), 3,4'-oxydianiline (3,4'-ODA); 2,2-bis(3-amino-4-hydroxyphenyl) hexafluoropropane (BAHFP); 2,2-bis(4-aminophenoxy) hexafluoropropane (HFBAPP); 1,3-bis(3-aminophenoxy) benzene (m-BAPB), 4,4'-bis(4-aminophenoxy) biphenyl (p-BAPB); 2,2-bis(3-aminophenyl) hexafluoropropane (BAPF); bis[4-(3-aminophenoxy)-phenyl]sulfone (m-BAPS); 2,2-bis[4-(4-aminophenoxy)phenyl]sulfone (p-BAPS); m-xylylenediamine (m-XDA); 2,2-bis(3-amino-4-methylphenyl) hexafluoropropane (BAMF); 9,9'-bis(4-aminophenyl) fluorene (FDA), 4,4'-(3,3,3',3'-tetramethyl-2,2',3,3'-tetrahydro-1,1'-spirobi[indene]-6,6'-diyl)dianiline, 3,3'-(3,3,3',3'-tetramethyl-2,2',3,3'-tetrahydro-1,1'-spirobi[indene]-6,6'-diyl)dianiline, 3,3'-(3,3,3',3'-tetramethyl-2,2',3,3'-tetrahydro-1,1'-spirobi[indene]-6,6'-diyl)dianiline, hexamethylenediamines (HMD), 1,4-cyclohexane-diamine (CHDA), 3,3',5,5'-tetramethyl-4,4'-diamonophenylmethane, 1,3-bis(4-aminophenoxy) benzene; 1,3'-bis(3-aminophenoxy) benzene (APB-133); and the like.

In some non-limiting embodiments, the aromatic diamines may be further substituted with functional groups selected from the group consisting of alkyl; aryl; nitro; cyano; —N(R')(R"); halo; hydroxy; carboxy; alkenyl; alkynyl; cycloalkyl; heteroaryl; alkoxy; aryloxy; heteroaryloxy; alkoxycarbonyl; perfluoroalkyl; perfluoroalkoxy; arylalkyl; silyl; siloxy; siloxane; thioalkoxy; —$S(O)_2$—; —C(═O)—N(R')(R"); (R')(R")N-alkyl; (R')(R")N-alkoxyalkyl; (R')(R")N-alkylaryloxyalkyl; —$S(O)_s$-aryl; and —$S(O)_s$-heteroaryl; and other group capable of forming new C—C or C-heteroatom bonds during the curing process; and wherein: R' and R" are the same or different at each occurrence and are an optionally substituted alkyl, cycloalkyl, or aryl group; 0≤S≤2; and the functional groups optionally contain crosslinking groups.

In some non-limiting embodiments, the aliphatic diamines are selected from the group consisting of 1,3-bis(aminoethyl) cyclohexane (m-CHDA); 1,4-bis(aminomethyl) cyclohexane (p-CHDA); 1,3-cyclohexanediamine; (8,8'-(4-hexyl-3-octylcyclohexane-1,2-diyl)bis(octan-1-amine); trans 1,4-damino cyclohexane; 4,4'-methylenebi(cyclohexylamine); bis(aminomethyl)norbornane; α-, ω-diaminoalkanes, (e.g., 1,6-hexanediamine; 1,8-octanediamine; 1,12-dodecanediamine); and the like.

In some non-limiting embodiments, the aliphatic diamines may be further substituted with functional groups selected from the group consisting of alkyl; aryl; nitro; cyano; —N(R')(R"); halo; hydroxy; carboxy; alkenyl; alkynyl; cycloalkyl; heteroaryl; alkoxy; aryloxy; heteroaryloxy; alkoxycarbonyl; perfluoroalkyl; perfluoroalkoxy; arylalkyl; silyl; siloxy; siloxane; thioalkoxy; —$S(O)_2$—; —C(═O)—N(R')(R"); (R')(R")N-alkyl; (R')(R")N-alkoxyalkyl; (R')(R")N-alkylaryloxyalkyl; —$S(O)_s$-aryl; and —$S(O)_s$-heteroaryl; and other group capable of forming new C—C or C-heteroatom bonds during the curing process; and wherein: R' and R" are the same or different at each occurrence and are an optionally substituted alkyl, cycloalkyl, or aryl group; 0≤S≤2; and the functional groups optionally contain crosslinking groups.

The one or more endcapping compounds comprising one or more crosslinking groups are not particularly limited and are selected from the group consisting of aliphatic endcapping compounds, aromatic endcapping compounds, heteroaromatic endcapping compounds, alkynl endcapping compounds, alkenyl endcapping compounds, maleimide endcapping compounds, vinyl endcapping compounds, allylic endcapping compounds, cyanate ester endcapping compounds, ester endcapping compounds, and the like.

In some non-limiting embodiments, the crosslinking groups of the endcapping compounds are selected from the group consisting of radical crosslinking groups, cationic crosslinking groups, anionic crosslinking groups, crosslinking groups capable of forming homopolymers by crosslinking with themselves, crosslinking groups capable of forming heteropolymers by crosslinking with other crosslinking groups, and combinations thereof.

In some non-limiting embodiments, the crosslinking groups of the endcapping compounds are any groups capable of forming carbon-carbon or carbon-heteroatom bonds and are selected from the group consisting of vinyl groups, alkynal groups, alkenyl groups, maleimide groups, allylic groups, cyanate ester groups, and ester groups.

In some non-limiting embodiments, the one or more endcapping compounds comprising one or more crosslinking groups is selected from the group consisting of 4-ethynylaniline (4-EA), 2,4-diamino-6-diallylamino-1,3,5-triazine (DAMA), 4-amino styrene (4AS), and the like.

In some non-limiting embodiments, the soluble polyimide resin disclosed herein comprises a single tetracarboxylic acid component residue. In some non-limiting embodiments, the soluble polyimide resin disclosed herein comprises two tetracarboxylic acid component residues wherein each tetracarboxylic acid component residue is present in a mole percent between 0.1% and 99.9%; in some non-limiting embodiments, the soluble polyimide resin disclosed herein comprises three tetracarboxylic acid component residues wherein each tetracarboxylic acid component residue is present in a mole percent between 0.1% and 99.9%; in some non-limiting embodiments, the soluble polyimide resin disclosed herein comprises four tetracarboxylic acid component residues wherein each tetracarboxylic acid component residue is present in a mole percent between 0.1% and 99.9%; in some non-limiting embodiments, the soluble polyimide resin disclosed herein comprises five tetracarboxylic acid component residues wherein each tetracarboxylic acid component residue is present in a mole percent between 0.1% and 99.9%; and in some non-limiting embodiments, the soluble polyimide resin disclosed herein comprises six or more tetracarboxylic acid component residues wherein each tetracarboxylic acid component residue is present in a mole percent between 0.1% and 99.9%.

In some non-limiting embodiments, the soluble polyimide resin disclosed herein comprises a single diamine component residue. In some non-limiting embodiments, the soluble polyimide resin disclosed herein comprises two diamine component residues wherein each diamine component residue is present in a mole percent between 0.1% and 99.9%; in some non-limiting embodiments, the soluble polyimide resin disclosed herein comprises three diamine component residues wherein each diamine component residue is present in a mole percent between 0.1% and 99.9%; in some non-limiting embodiments, the soluble polyimide resin disclosed herein comprises four diamine component residues wherein each diamine component residue is present in a mole percent between 0.1% and 99.9%; in some non-limiting embodiments, the soluble polyimide resin disclosed herein comprises five diamine component residues wherein each diamine component residue is present in a mole percent between 0.1% and 99.9%; and in some non-limiting embodiments, the soluble polyimide resin disclosed herein comprises six or more diamine component residues wherein each diamine component residue is present in a mole percent between 0.1% and 99.9%.

In some non-limiting embodiments, the soluble polyimide resin disclosed herein comprises a single endcapping compound; in some non-limiting embodiments two endcapping compounds; in some non-limiting embodiments three endcapping compounds; and in some non-limiting embodiments four or more endcapping compounds.

The amount of the one or more endcapping compounds used in the soluble polyimide resins and/or associated formulations disclosed herein depends upon the targeted properties of interest (e.g., thermal properties, mechanical properties, etc.). In some non-limiting embodiments between 0.1 mol % and 70 mol % of the one or more endcapping compounds are used; in some non-limiting embodiments between 1 mol % and 65 mol %; in some non-limiting embodiments between 5 mol % and 60 mol %; in some non-limiting embodiments between 10 mol % and 50 mol %; in some non-limiting embodiments between 15 mol % and 40 mol %; in some non-limiting embodiments between 20 mol % and 35 mol %; in some non-limiting embodiments between 25 mol % and 30 mol %; in some non-limiting embodiments about 4 mol %; in some non-limiting embodiments about 5 mol %; in some non-limiting embodiments about 6 mol %; in some non-limiting embodiments about 7 mol %; and in some non-limiting embodiments about 8 mol %.

There is further provided a soluble polyimide resin comprising: (a) one or more tetracarboxylic acid component residues; (b) one or more diamine component residues; and (c) one or more endcapping compounds; wherein: the one or more endcapping compounds comprise one or more crosslinking groups; and additionally comprising one or more residues selected from the group consisting of (d) one or more triamine component residues; (e) one or more tetraamine component residues; (f) one or more hexacarboxylic acid trianhydride component residues; and (g) one or more dicarboxylic acid monohydride component residues.

Specific embodiments for the (a) one or more tetracarboxylic acid component residues; (b) one or more diamine component residues; and (c) one or more endcapping compounds; wherein: the one or more endcapping compounds comprise one or more crosslinking groups for these soluble polyimide resins are the same as those disclosed above herein.

The one or more triamine component residues are not particularly limited and are derived from the corresponding triamines selected from the group consisting of aromatic triamines and aliphatic triamines.

In some non-limiting embodiments, the one or more triamines are selected from the group consisting of diethylenetriamine, 4,4',4"-methanetriyltrianiline, 5'-(4-aminophenyl)-[1,1':3',1"-terphenyl]-4,4"-diamine, 4,4',4"-(1,3,5-triazine-2,4,6-triyl)trianiline, $N^1$,$N^1$-bis(4-aminophenyl)benzene-1,4-diamine, N1,N1-bis(3-aminophenyl)benzene-1,3-diamine, 4'-(3-aminophenyl)-[1,1':2',1"-terphenyl]-3,3"-diamine, 5'-(3-aminophenyl)-[1,1':3',1"-terphenyl]-3,3"-diamine, 5'-(4-aminophenyl)-[1,1':3',1"-terphenyl]-3,3"-diamine.

In some non-limiting embodiments, the triamines may be further substituted with functional groups selected from the group consisting of alkyl; aryl; nitro; cyano; —N(R')(R"); halo; hydroxy; carboxy; alkenyl; alkynyl; cycloalkyl; heteroaryl; alkoxy; aryloxy; heteroaryloxy; alkoxycarbonyl; perfluoroalkyl; perfluoroalkoxy; arylalkyl; silyl; siloxy; siloxane; thioalkoxy; —$S(O)_2$—; —C(=O)—N(R')(R"); (R')(R")N-alkyl; (R')(R")N-alkoxyalkyl; (R')(R")N-alkylaryloxyalkyl; —$S(O)_s$-aryl; and —$S(O)_s$-heteroaryl; and other group capable of forming new C—C or C-heteroatom bonds during the curing process; and wherein: R' and R" are the same or different at each occurrence and are an optionally substituted alkyl, cycloalkyl, or aryl group; $0 \leq S \leq 2$; and the functional groups optionally contain crosslinking groups.

The one or more tetraamine component residues are not particularly limited and are derived from the corresponding tetramines selected from the group consisting of aromatic tetramines and aliphatic tetramines.

In some non-limiting embodiments, the one or more tetramines are selected from the group consisting of tetraaminoethylene, [1,1':3',1"-terphenyl]-3,3",5,5"-tetraamine, [1,1':4',1"-terphenyl]-3,3",5,5"-tetraamine, 5,5'-(1,3,5-triazine-2,4-diyl)bis(benzene-1,3-diamine), 5,5'-(9-methyl-9H-carbazole-3,6-diyl)bis(benzene-1,3-diamine), and 5,5'-(9H-carbazole-3,9-diyl)bis(benzene-1,3-diamine).

In some non-limiting embodiments, the tetramines may be further substituted with functional groups selected from the group consisting of alkyl; aryl; nitro; cyano; —N(R')(R"); halo; hydroxy; carboxy; alkenyl; alkynyl; cycloalkyl; heteroaryl; alkoxy; aryloxy; heteroaryloxy; alkoxycarbonyl; perfluoroalkyl; perfluoroalkoxy; arylalkyl; silyl; siloxy; siloxane; thioalkoxy; —$S(O)_2$—; —C(=O)—N(R')(R"); (R')(R")N-alkyl; (R')(R")N-alkoxyalkyl; (R')(R")N-alkylaryloxyalkyl; —$S(O)_s$-aryl; and —$S(O)_s$-heteroaryl; and other group capable of forming new C—C or C-heteroatom bonds during the curing process; and wherein: R' and R" are the same or different at each occurrence and are an optionally substituted alkyl, cycloalkyl, or aryl group; $0 \leq S \leq 2$; and the functional groups optionally contain crosslinking groups.

The one or more hexacarboxylic acid trianhydride component residues are not particularly limited and are derived from the corresponding tricarboxylic acids selected from the group consisting of aromatic hexacarboxylic acid trianhydrides and aliphatic hexacarboxylic acid trianhydrides.

In some non-limiting embodiments, the one or more hexacarboxylic acid trianhydrides are selected from the group consisting of 5,5',5"-nitrilotris-(isobenzofuran-1,3-dione) and 5,5',5"-(benzene-1,3,5-triyl)tris(isobenzofuran-1,3-dione).

In some non-limiting embodiments, the hexacarboxylic acids trianhydrides may be further substituted with functional groups selected from the group consisting of alkyl; aryl; nitro; cyano; —N(R')(R"); halo; hydroxy; carboxy; alkenyl; alkynyl; cycloalkyl; heteroaryl; alkoxy; aryloxy; heteroaryloxy; alkoxycarbonyl; perfluoroalkyl; perfluoroalkoxy; arylalkyl; silyl; siloxy; siloxane; thioalkoxy; —$S(O)_2$—; —C(=O)—N(R')(R"); (R')(R")N-alkyl; (R')(R")N-alkoxyalkyl; (R')(R")N-alkylaryloxyalkyl; —$S(O)_s$-aryl; and —$S(O)_s$-heteroaryl; and other group capable of forming new C—C or C-heteroatom bonds during the curing process; and wherein: R' and R" are the same or different at each occurrence and are an optionally substituted alkyl, cycloalkyl, or aryl group; 0≤S≤2; and the functional groups optionally contain crosslinking groups.

The one or more dicarboxylic acid monoanhydrides component residues are not particularly limited and are derived from the corresponding dicarboxylic acids selected from the group consisting of aromatic dicarboxylic acids and aliphatic dicarboxylic acids.

In some non-limiting embodiments, the one or more dicarboxylic acid monoanhydrides are selected from the group consisting of 5-ethenyl-1,3-isobenzofurandione, 5-ethynylisobenzofuran-1,3-dione, 5-allylisobenzofuran-1,3-dione, 5-(vinyloxy)isobenzofuran-1,3-dione, and 5-(ethynyloxy)isobenzofuran-1,3-dione.

In some non-limiting embodiments, the dicarboxylic acid monoanhydrides may be further substituted with functional groups selected from the group consisting of alkyl; aryl; nitro; cyano; —N(R')(R"); halo; hydroxy; carboxy; alkenyl; alkynyl; cycloalkyl; heteroaryl; alkoxy; aryloxy; heteroaryloxy; alkoxycarbonyl; perfluoroalkyl; perfluoroalkoxy; arylalkyl; silyl; siloxy; siloxane; thioalkoxy; —$S(O)_2$—; —C(=O)—N(R')(R"); (R')(R")N-alkyl; (R')(R")N-alkoxyalkyl; (R')(R")N-alkylaryloxyalkyl; —$S(O)_s$-aryl; and —$S(O)_s$-heteroaryl; and other group capable of forming new C—C or C-heteroatom bonds during the curing process; and wherein: R' and R" are the same or different at each occurrence and are an optionally substituted alkyl, cycloalkyl, or aryl group; 0≤S≤2; and the functional groups optionally contain crosslinking groups.

The amount of the one or more one or more residues selected from the group consisting of (d) one or more triamine component residues; (e) one or more tetraamine component residues; (f) one or more tricarboxylic acid component residues; and (g) one or more dicarboxylic acid component residues used in the soluble polyimide resins and/or associated formulations disclosed herein depends upon the targeted properties of interest (e.g., thermal properties, mechanical properties, etc.). In some non-limiting embodiments between 0.1 mol % and 70 mol % of the one or more these residues are used; in some non-limiting embodiments between 1 mol % and 65 mol %; in some non-limiting embodiments between 5 mol % and 60 mol %; in some non-limiting embodiments between 10 mol % and 50 mol %; in some non-limiting embodiments between 15 mol % and 40 mol %; in some non-limiting embodiments between 20 mol % and 35 mol %; in some non-limiting embodiments between 25 mol % and 30 mol %; in some non-limiting embodiments about 4 mol %; in some non-limiting embodiments about 5 mol %; in some non-limiting embodiments about 6 mol %; in some non-limiting embodiments about 7 mol %; and in some non-limiting embodiments about 8 mol %.

Non-limiting examples of the soluble PI resins disclosed herein include: ODPA//TFMB/APB-133/4AS 100//49/49/4; ODPA//TFMB/APB-133/DAMA/4AS 100//46.5/46.5/5/4; BPADA//APB-133/TFMB/4AS 100/42.5/42.5/30; ODPA/6FDA//TFMB/Priamine™ 1075/4-AS 85/15//91/05/08; ODPA//APB-133/TFMB/DAMA/4-EA 100//46.5/46.5/05/04; ODPA//APB-133/TFMB/M1309/4-AS 100//46/46/04/08; BPADA//APB-133/4-AS 100//85/30; and BPADA//APB133/TFMB/1-(4-aminophenyl)-1H-pyrrole-2,5-dione) 100//42.5/42.5/30.

The arylcyclobutene resins disclosed herein can be formed by copolymerizing the above-described addition polymerizable monomers by the action of a thermal initiator, photoinitiator or other photoactive compounds. In one embodiment, the copolymerization process comprises providing a mixture of the addition polymerizable monomers described above and a radical initiator in a polar solvent; and heating the mixture to a temperature of 50-150° C. over a period of 5-50 hours. In another embodiments, the copolymerization process comprises providing a mixture of the addition polymerizable monomers described above in a polar solvent; heating the mixture to a temperature of 50-150° C. to form a heated mixture, and continuously feeding a radical initiator into the heated mixture over a period of 5-50 hours.

The polar solvent can be a single organic compound or a mixture of compounds. The polar solvent is one in which the monomers are miscible or dispersible. The polar solvent can be present in an amount of 10-70 wt. %, or 20-50 wt. % based on the total weight of the reaction mixture. In one embodiment, the polar solvent can be an aprotic organic solvent, such as (cyclo)alkanone or cyclic ester, or a linear or branched ketone and $C_{1-8}$ esters.

The radical initiator is generally an azo compound or an organic peroxide. In one embodiment, the radical initiator is an oil soluble azo compound. Such initiators can include, for example, dimethyl 2,2'-azobis(2-methylpropionate) and 2,2'-azobis(2,4-dimethylvaleronitrile). The total initiator added can be in a range of 1-5 wt. %, based on the weight of the starting reaction mixture.

After the desired reaction time, the resulting final reaction mixture is obtained, cooled to room temperature (20-25° C.), and treated as necessary. The polymers of the present disclosure may be used as is or may be isolated by adding a non-solvent, such as water or methanol, to precipitate the polymer from the solution and thereafter removing the organic solvent.

The soluble polyimide resins disclosed herein can be formed by performing the following steps in order: (a) dissolving one or more diamines in a high-boiling, polar, aprotic solvent; (b) adding one or more endcapping compounds to the solution prepared in (a); (c) adding one or more dianhydrides to the solution prepared in (b); (d) stirring the solution prepared in (c) for a first predetermined period of time; (e) heating the solution prepared in (d) to a first predetermined temperature and adding a solution of one or more imidization catalysts; (f) heating the solution prepared in (e) to a second predetermined temperature and stirring for a second predetermined period of time; and (g) cooling the solution prepared in (f) and isolating the solid polyimide resin.

In some non-limiting embodiments, the one or more imidization catalysts is selected from the group consisting of aliphatic acid anhydrides, acid anhydrides, aliphatic tertiary amines, tertiary amines, and heterocyclic tertiary amines.

The present disclosure is further directed to liquid compositions comprising the above-described resins dissolved or dispersed in one or more organic solvents. The liquid compositions can be deposited onto a substrate to form a film using any known technique and subsequently heated to remove solvent. This can be followed by an additional heating step to cure the film. In some non-limiting embodiments, the liquid compositions of the present disclosure can be used to form a dielectric film for photolithography, packaging, adhesive, sealing and bulk dielectric applications, such as in spin on coatings or buffer layers. The dielectric film formed on the substrate can be used directly or can be peeled off and used on different substrates in electronic devices.

Any substrate known in the art can be used in the present disclosure. Examples of the substrate can include, but are not limited to, silicon, copper, silver, indium tin oxide, silicon dioxide, glass, silicon nitride, aluminum, gold, polyimide, and epoxy mold compound.

Suitable organic solvents are those in which the resins are soluble. Particularly useful organic solvents are any solvents useful in the making or formulation of arylcyclobutene polymers. Exemplary organic solvents include, without limitation, polar protic and polar aprotic solvents, for example, cyclopentanone, cyclohexanone, propylene glycol monomethyl ether, propylene glycol monomethyl ether acetate, gamma-butyrolactone, 3-methoxypropionate, dipropylene glycol dimethyl ether, 3-methoxybutyl acetate, anisole, mesitylene, 2-heptanone, cyrene, 2-butanone, ethyl lactate, amyl acetate, n-butyl acetate, n-methyl-2-pyrrolidone, N-butyl-2-pyrrolidone, 2-butanone, toluene, and mixtures thereof.

In some non-limiting embodiments, the liquid compositions disclosed herein additionally contain 35-80 weight % of the total non-volatile weight of the composition of one or more inorganic particular fillers, in some non-limiting embodiments 45-75 weight %, in some non-limiting embodiments 50-72 weight %, and in some non-limiting embodiments 54-68 weight %.

In some non-limiting embodiments of the liquid compositions disclosed herein, the at least one inorganic particulate filler is selected from the group consisting of inorganic fillers having dielectric constants of less than 5 and dielectric loss (in GHz range) of less than 0.002. Any particulate filler with these properties is generally useful, as long as it is less than about 2 μm average size or about 8 μm absolute size, and has good insulative properties, and/or good dielectric properties. In some non-limiting embodiments, the inorganic particulate filler preferably has an average particle size of less than or equal to ten percent of the layer thickness of the dielectric composite material in the final product. In some non-limiting embodiments, the inorganic particulate filler has a dielectric constant of less than or equal to 4.0, and a dielectric loss of less than 0.001. Non-limiting examples of inorganic particulate fillers include silica, alumina, boron nitride, glass, and quartz.

In some non-limiting embodiments of the liquid compositions disclosed herein, the at least one inorganic particulate filler is surface modified via reaction with one or more silane coupling agents. the selection of silane coupling agents used for surface modification of the at least one inorganic particulate filler is not particularly limited. In some non-limiting embodiments of the dielectric composite material disclosed herein, the one or more acrylic-based silane coupling agents has a structure given by Formula (VII)

(VII)

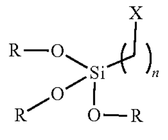

where R is the same or different at each occurrence and is selected from the group consisting of alkyl, aryl, acetyl, ketimino, and alkenyl; X is an unsaturated group selected from the group consisting of acryloxy, methacryloxy, allyloxy, vinyl, maleimido, fumarate ester, maleate ester, ethynyl, phenylethynyl, phenylamino, phenyl, stilbene, propiolate and phenylpropiolate ester; and n is an integer from 0-10. In some non-limiting embodiments, the silane coupling agent is acrylic-based. In some non-limiting embodiments, the silane coupling agent is monomeric, and in some non-limiting embodiments the silane coupling agent is polymerized through a vinyl group.

Examples of the acrylic-based silane coupling agents can include, but are not limited to, bis(trimethoxysilyl)propyl fumarate, 8-methacryloxyoctyl-trimethoxysilane (KBM-5803), acryloxy and methyl methoxy silane oligomer (KR-513), methacryloxy and methyl methoxy silane oligomer (X-40-9296), mercapto and methyl methoxy silane oligomer (KR-519), mercapto methoxy silane organic chain oligomer (X-12-1154), and 3-methacryloxypropy trimethoxy silane (KBM-503), 3-methacryloxypropy methyldimethoxy silane (KBM-502), 3-methacryloxypropy triethoxy silane (KBE-503), N-phenyl-3-amino propyl trimethoxy silane (KBM-573), and phenyl trimethoxy silane (KBM-103).

In some non-limiting embodiments of the dielectric composite material disclosed herein, the one or more acrylic-based silane coupling agents is combined with one or more polymeric silanes for surface modification of the inorganic particulate filler. In some non-limiting embodiments, the one or more polymeric silanes has a structure given by Formula (VIII)

(VIII)

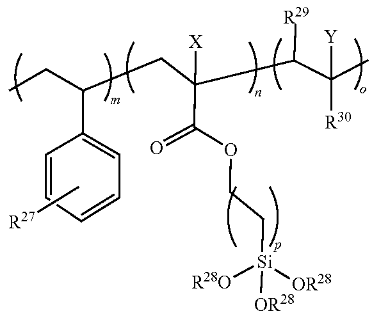

where $R^{27}$ is selected from the group consisting of alkyl and H; $R^{28}$ is selected from the group consisting of alkyl and aryl, acetyl, ketimino, and alkenyl; $R^{29}$ is selected from the group consisting of $COOCH_2CH{=}CH_2$, $CH_3$, and H; $R^{30}$ is selected from the group consisting of 4-allyloxyphenyl, $COOCH_2CH{=}CH_2$ and any group containing a reactive dienophile; X and Y are the same or different and are selected from the group consisting of methyl and H; m and n are the same or different and are an integer from 10-1000; o is an integer from 0-1000; and p is an integer from 0-10.

In some non-limiting embodiments, the liquid compositions disclosed herein comprise one or more organic particulate fillers which may be rubber particles or the like. The rubber particles are not soluble even in an organic solvent used for the preparation of the disclosed resin compositions and are also immiscible with components in the resin composition such as an arylcyclobutene resin. Accordingly, the rubber particles in the present invention are present in a dispersed state in a varnish of the disclosed resin composition. Such rubber particles are usually prepared by making the molecular weight of the rubber component high to such a level that they are not dissolved in organic solvents and resin and by making into particles. For example, a rubber component which is soluble in a solvent and is miscible with other component such as arylcyclobutene resin in the resin composition is compounded, roughness after the roughening treatment greatly increases and heat resistance of the cured product also lowers.

Non-limiting examples of the rubber particles in the present invention include core-shell type rubber particles, cross-linked acrylonitrile butadiene rubber particles, cross-linked styrene butadiene rubber particles, and acrylate rubber particles. Core-shell type rubber particles are rubber particles where the particle has a core layer and a shell layer and its examples are a two-layered structure where the shell layer which is an outer layer is glass-like polymer and the core layer which is an inner layer is a rubber-like polymer and a three-layered structure where the shell layer which is an outer layer is a glass-like polymer, an intermediate layer is a rubber-like polymer and the core layer is a glass-like polymer. The glass layer is constituted, for example, from a polymer of methyl methacrylate while the rubber-like polymer layer is constituted, for example, from a polymer of butyl acrylate (butyl rubber). Specific examples of the core-shell type rubber particles include Staphylocid AC 3832 and AC 3816 N (trade name; Ganz Chemical Co., Ltd.) and Metablen KW-4426 (trade name; Mitsubishi Rayon Co., Ltd.). Specific examples of the acrylonitrile butadiene rubber (NBR) particles include XER-91 (average particle size: 0.5 μm; manufactured by JSR Co.), etc. Specific examples of the styrene butadiene rubber (SBR) particles include XSK-500 (average particle size: 0.5 m; manufactured by JSR Co.), etc. Specific examples of the acrylate rubber particles include Metablen W300A (average particle size: 0.1 μm) and W450A (average particle size: 0.2 μm) (manufactured by Mitsubishi Rayon Co., Ltd.). Such rubber particles are able to bestow the effects such as enhancing the mechanical strength of cured product, mitigating the stress of the cured product, etc.

An average particles size of the rubber particles to be compounded is generally within a range of 0.005 to 1 μm and, in some non-limiting embodiments, within a range of 0.2 to 0.6 μm. Average particle size of the rubber particles in the present invention is able to be measured using a dynamic light scattering method. The measurement is carried out, for example, in such a manner that rubber particles are uniformly dispersed by an ultrasonic wave, etc. in an appropriate organic solvent, particle size distribution of the rubber particles are prepared on the basis of mass using an FPRA-1000 (manufactured by Otsuka Electronics Co., Ltd.) and a median diameter thereof is adopted as an average particle size.

In some non-limiting embodiments, the liquid compositions disclosed herein contain 40-80 weight % of one or more organic particular fillers, in some non-limiting embodiments 45-75 weight %, in some non-limiting embodiments 50-72 weight %, and in some non-limiting embodiments 54-68 weight %.

In some non-limiting embodiments, the liquid compositions disclosed herein additionally contain 1-30 weight % of one or more crosslinkers, in some non-limiting embodiments 2-25 weight %, in some non-limiting embodiments 5-20 weight %, and in some non-limiting embodiments 12-18 weight %.

Any suitable crosslinker may be used in the present liquid compositions. A suitable crosslinker may react with functional groups in the resin composition, including alkenes and Diels Alder dienes as chosen by one skilled in the art. Such suitable crosslinkers may include multifunctional thiols, multifunctional azides, multifunctional azirines, and bis-arylcyclobutene monomers as well as multifunctional dienophiles such as (meth)acrylates, maleimides, allyl compounds, vinyl silane compounds, or other suitable dienophiles, provided that they crosslink with the polymer of the present disclosure under the conditions used to cure the composition. The selection of such crosslinkers is within the ability of those skilled in the art.

In some non-limiting embodiments, the one or more crosslinkers are selected from the group consisting of multifunctional thiols, multifunctional azides, multifunctional azirines, bis-arylcyclobutenes, (meth)acrylates, maleimides, allyl compounds, vinyl silane compounds, and other suitable dienophiles. In some non-limiting embodiments, the one or more crosslinkers are maleimides. In some non-limiting embodiments, the maleimides comprise one or more biphenyl groups. In some non-limiting embodiments the one or more crosslinkers are selected from the group consisting of MIR3000, MIR5000, BMI4000, BMI5100, and BMI-TMH.

In some non-limiting embodiments, the liquid compositions disclosed herein additionally contain 1-40 weight % of one or more components selected from the group consisting of maleimide resins, cyanate esters, allylic resins, butadiene resins, and (meth)acrylate resins; in some non-limiting embodiments 2-30 weight %; in some non-limiting embodiments 5-20 weight %; and in some non-limiting embodiments 8-12 weight %.

In some non-limiting embodiments, the maleimide resins are selected from the group consisting of MIR3000, MIR5000, BMI4000, BMI5100, BMI-TMH, BMI-689, BMI-1000, BMI-2000, BMI-3000, BMI-4000, BMI-5100, BMI-7000, BMI-3000, BMI-1400, BMI-1500, BMI-1550, BMI-1700, BMI-5000, BMI-2500,BMI-2560, PERKALINK 900,

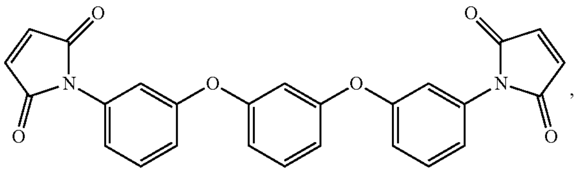
,

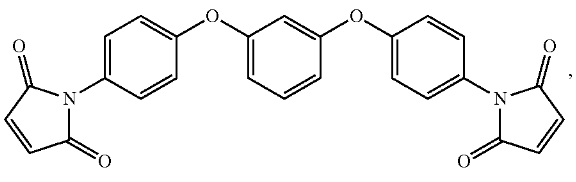
,

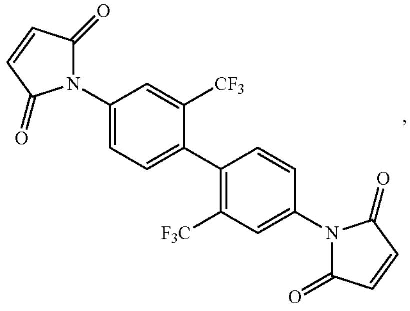
,

-continued
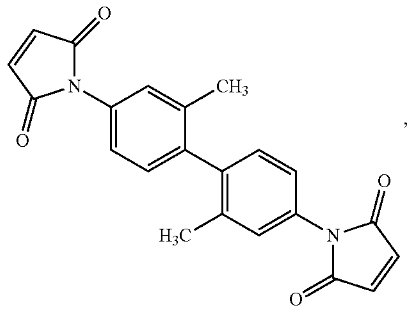
,
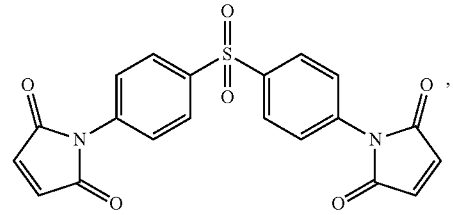
,
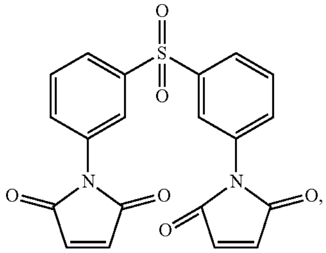
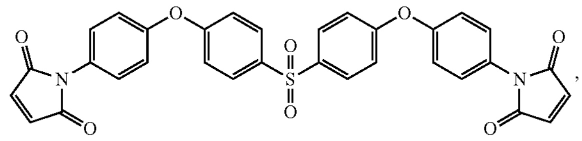
,
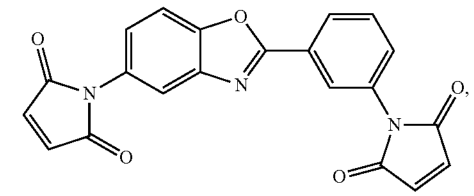
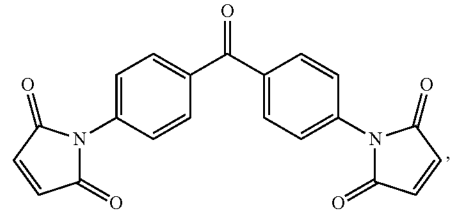
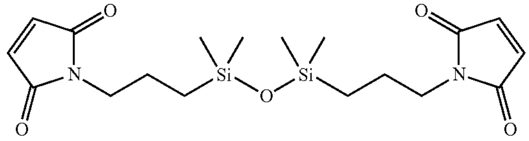
,
-continued
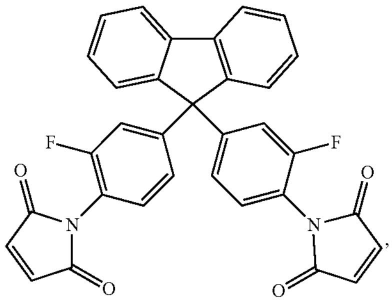
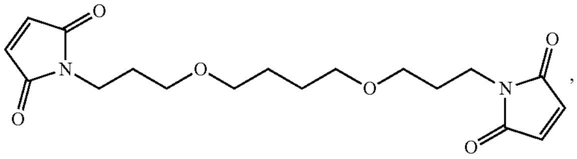
,
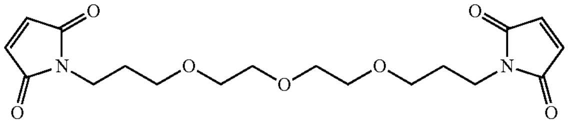
,
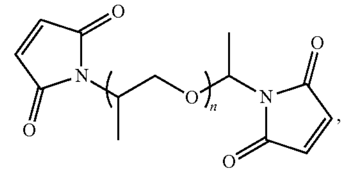
n = 3-70
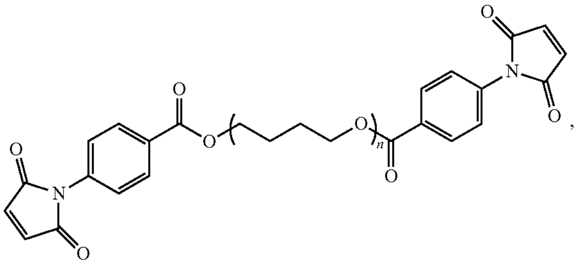
,
n = 2-3
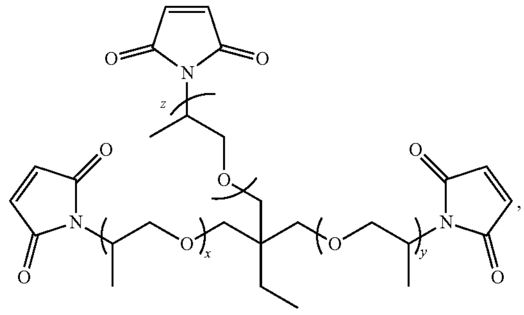
x = 7-90
y = 7-90
z = 7-90
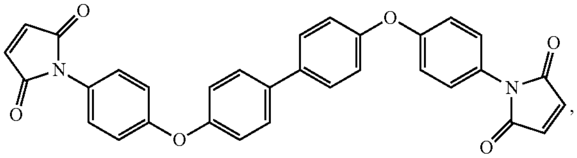

-continued

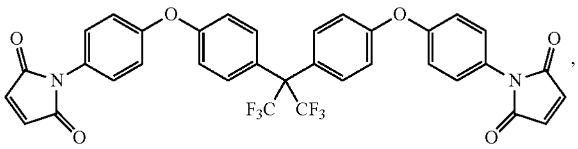,

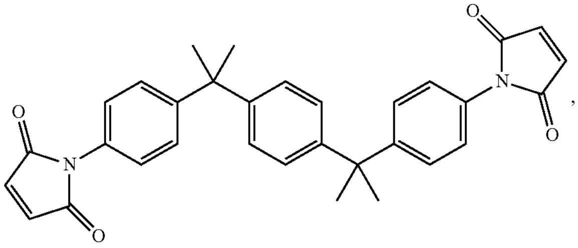,

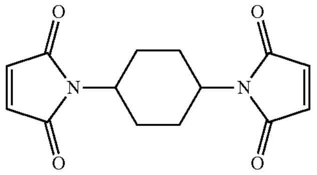, and

-continued

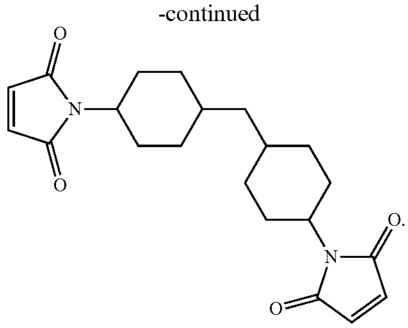.

In some non-limiting embodiments, the cyanate esters are selected from the group consisting of L-10, M-10, XUS-371, F-10 (Lonza), DT-4000 (Lonza), allyl cinnamate, TA-G (Shikoku), LDAIC (Shikoku), MeDAIC (Shikoku), BANI-M (Maruzen), and BANI-X (Maruzen).

In some non-limiting embodiments, the allylic resins are selected from the group consisting of TAC, TAIC, the corresponding oxygen ether of phenolic resins such as the condensation products of aldehydes and phenol or amine derivatives, including but not limited to the likes of KAYA-HARD GPH-65, GPH-103 and KTG-105 from Nippon Kayaku.

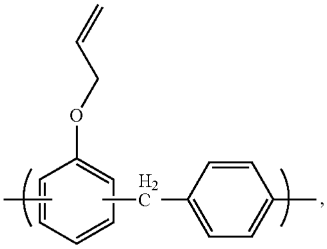,

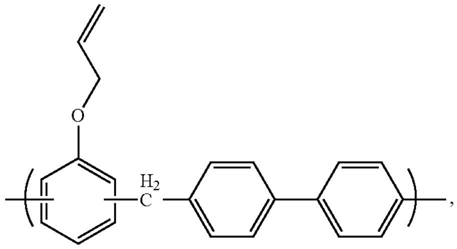,

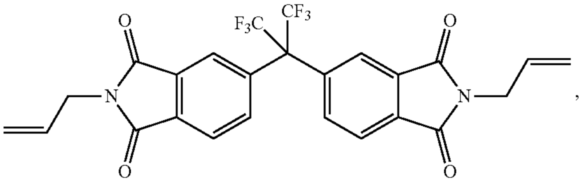,

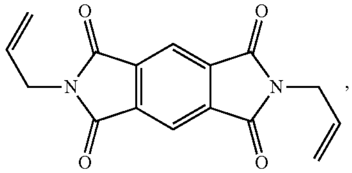,

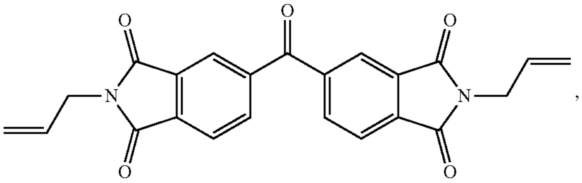,

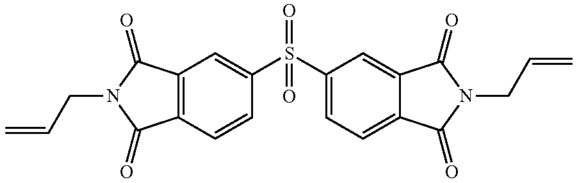,

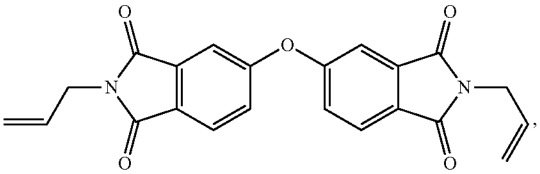,

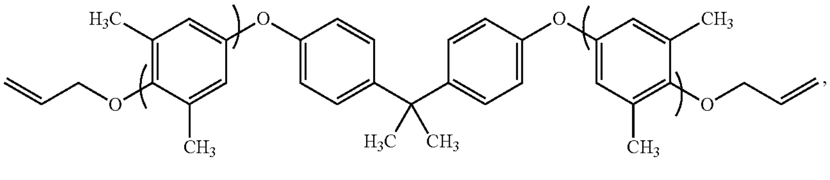,

-continued

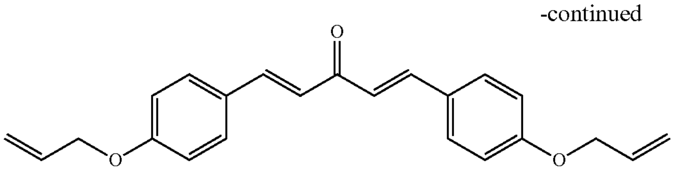

,

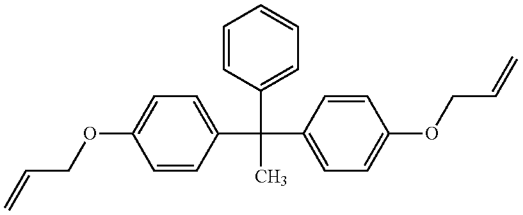

,

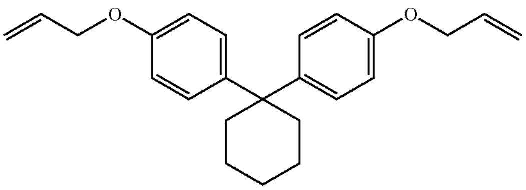

,

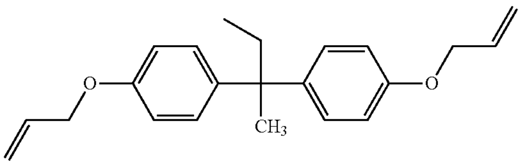

,

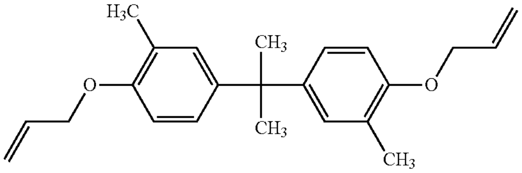

,

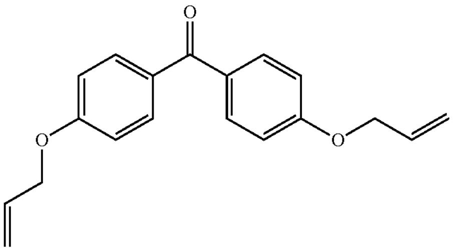

,

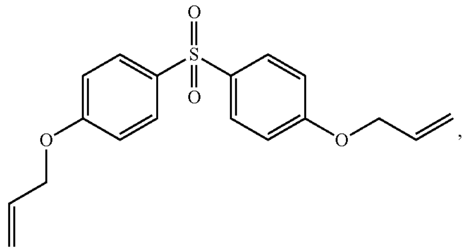

, and

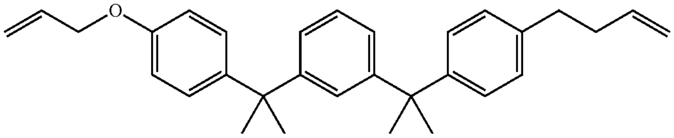

.

In some non-limiting embodiments, the butadiene resins are selected from the group consisting of BAC45 (Osaka Ltd.), GI1000 (Nippon Soda Co. Ltd.), GI2000 (Nippon Soda Co. Ltd.), GI3000 (Nippon Soda Co. Ltd.), B1000 (Nippon Soda Co. Ltd.), B2000 (Nippon Soda Co. Ltd.), and B3000 (Nippon Soda Co. Ltd.).

In some non-limiting embodiments, the (meth)acrylate resins are selected from the group consisting of DCP-M (Kowa Chemical), PEAM-645, PEAM-1044, PEAM-1769, PEAM-665, PEAM-1066 (Designer Molecules), SR444, SR355, SR335, SR351, SR295, SR399, SR454, CN1964, CN9025, CN9030, CN4002, CN132, CN133, CN2261, CN2262, CN2279 (Sartomer Americas), SA9000 (Sabic),

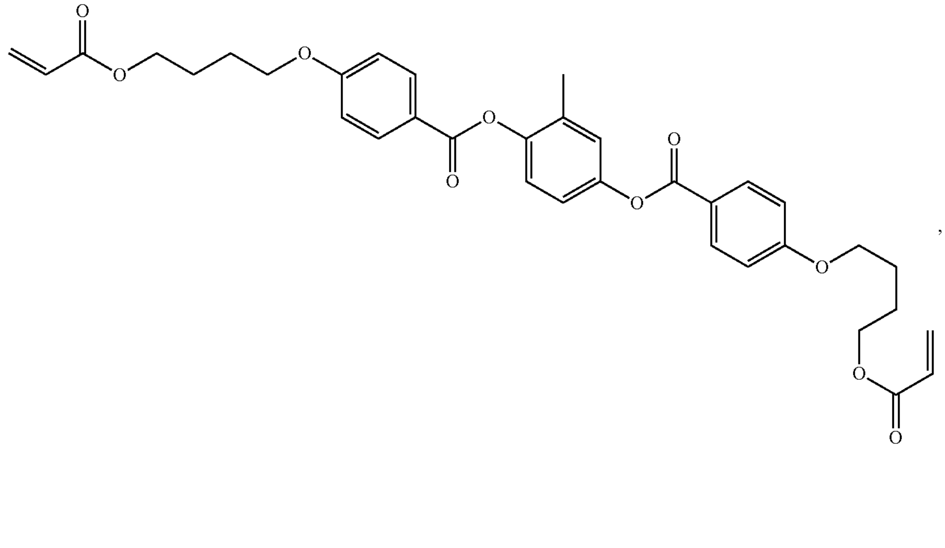

,

-continued

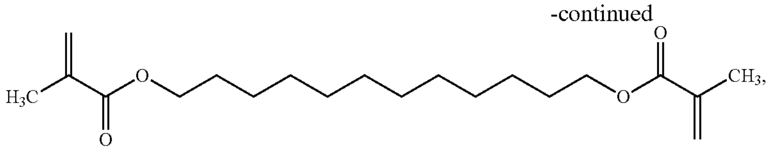

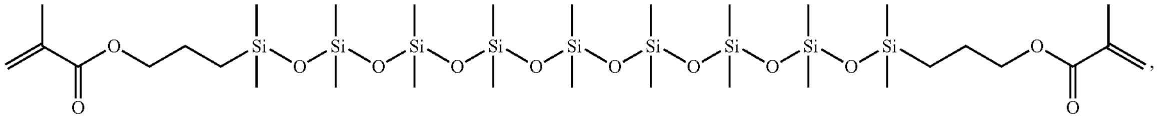

, and

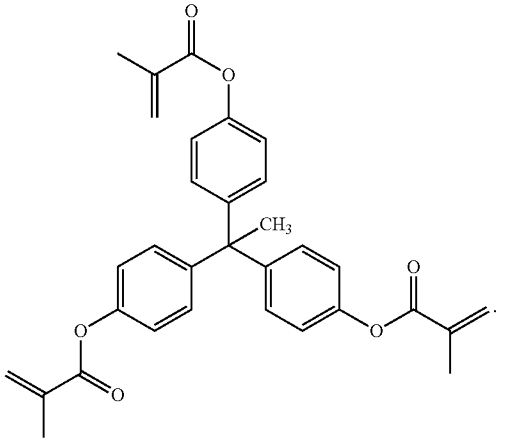

Suitable additives can optionally be added into the liquid compositions of the present disclosure. Examples of the additives can include, without limitation, one or more of each of curing agents, crosslinkers, such as crosslinking monomers separate from the polymer, surfactants, inorganic fillers, organic fillers, plasticizers, adhesion promoters, metal passivating materials, and combinations of any of the foregoing. Suitable surfactants are well-known to those skilled in the art, and nonionic surfactants are preferred. Such surfactants may be present in an amount of from 0 to 10 g/L, or from 0 to 5 g/L.

Any suitable inorganic fillers may optionally be used in the present compositions and are well-known to those skilled in the art. Exemplary inorganic fillers can include, but are not limited to, silica, alumina, barium sulfate, talc, clay, a mica powder, aluminum hydroxide, magnesium hydroxide, calcium carbonate, magnesium carbonate, magnesium oxide, boron nitride, aluminum borate, barium titanate, strontium titanate, calcium titanate, magnesium titanate, bismuth titanate, titanium oxide, barium zirconate, and calcium zirconate. In some non-limiting embodiments the silica may be amorphous silica, pulverized silica, fumed silica, crystalline silica, synthetic silica, or hollow silica. In some non-limiting embodiments, spherical silica is used. Inorganic fillers may be used individually or in combination of two or more. In some non-limiting embodiments, no inorganic fillers are used.

The average particle diameter of the inorganic filler is not particularly limited. From the viewpoint of forming a fine wiring on an insulating layer, the upper limit of the average particle diameter of the inorganic filler is 5 μm or less, in some non-limiting embodiments 3 μm or less, in some non-limiting embodiments 1 μm or less, in some non-limiting embodiments 0.7 μm or less, in some non-limiting embodiments 0.5 μm or less, in some non-limiting embodiments 0.4 μm or less, and in some non-limiting embodiments 0.3 μm or less. On the other hand, the lower limit of the average particle diameter of the inorganic filler can be 0.01 μm or more, in some non-limiting embodiments 0.03 μm or more, in some non-limiting embodiments 0.05 μm or more, in some non-limiting embodiments 0.07 μm or more, and in some non-limiting embodiments 0.1 μm or more.

The average particle diameter of the inorganic filler can be measured by a laser diffraction and scattering method on the basis of the Mie scattering theory. Specifically, the particle size distribution of the inorganic filler is prepared on the volume basis using a laser diffraction particle size distribution measuring device, and a median diameter thereof can be measured as an average particle diameter. Measurements can be made on a dispersion in which the inorganic filler is dispersed in water by ultra-sonification. Measurements can be made on commercially available equipment such as the LA-500, 750, and 950 manufactured by Horiba, Ltd., or the like.

The inorganic filler is typically used in an amount of from 35 wt % to 80 wt % based on the total non-volatile weight of the composition.

The inorganic filler may or may not be treated with a coupling agent surface treatment to compatibilize the filler with the thermosetting resin. One having skill in the art can discern how the surface treatment should be selected so as to match the appropriate thermosetting chemistry. Non-limiting examples of surface treatments include phenyltrimethoxysilane, methacrylpropyltrimethoxy silane, N-phenyl-3-aminopropyltrimethoxysilane, mercaptopropyltrimethoxysilane, hexamethyldisilazane, and diisopropoxytitanium bis(triethanolaminate).

The metal passivating material can be a copper passivating agent. Suitable copper passivating agents are well known in the art and include imidazoles, benzotriazoles, ethylene diamine or its salts or acid esters, and iminodiacetic acids or salts thereof. The metal passivating material is typically used in an amount of from 0 to 5 wt. %, or from 0.2 to 1 wt. %, based on the total weight of the polymerizable monomers in the composition.

A variety of curing agents may be used in the liquid compositions of the present disclosure which are useful in photolithography. Suitable curing agents may aid in the curing of the bis-benzocyclobutene containing materials and may be activated by heat or light. Exemplary curing agents can include, but are not limited to, thermally generated initiators and photoactive compounds (photogenerated initiators). The selection of such curing agents is within the ability of those skilled in the art. Preferred thermal generated initiators are free radical initiators, such as, but not limited to, azobisisobutyronitrile, dibenzoyl peroxide, and dicumylperoxide. Preferred photoactive curing agents are free radical photoinitiators available from BASF under the Irgacure brand, and diazonaphthoquinone (DNQ) compounds including sulfonate esters of a DNQ compound. Suitable DNQ compounds are any compounds having a DNQ moiety, such as a DNQ sulfonate ester moiety, and that function as photoactive compounds in the present compositions, that is, they function as dissolution inhibitors upon exposure to appropriate radiation. Suitable DNQ compounds are disclosed in U.S. Pat. Nos. 7,198,878 and 8,143,360, the entire contents of which are incorporated herein by reference.

The amount of photoactive compound varies from 0 to 30 wt. %, based on the total weight of the polymer solids. When present, the photoactive compound is typically used in an amount of 5 to 30 wt. %, or from 5 to 25 wt. %, or from 10 to 25 wt. %, based on the total weight of polymer solids.

Any suitable adhesion promoter may be used in the liquid compositions of the present disclosure and the selection of such adhesion promoter is well within the ability of those skilled in the art. In some non-limiting examples, adhesion promoters are silane-containing materials or tetraalkyl titanates, or trialkoxysilane-containing materials. Exemplary adhesion promoters include, but are not limited to, bis (trialkoxysilylalkyl)benzenes such as bis(trimethoxysilylethyl)benzene; aminoalkyl trialkoxy silanes such as aminopropyl trimethoxy silane, aminopropyl triethoxy silane, and phenyl aminopropyl triethoxy silane; and other silane coupling agents, as well as mixtures of the foregoing. Adhesion promoters may be applied first as a primer layer or as an additive to the composition. Particularly suitable adhesion promoters include AP 3000, AP 8000, and AP 9000C, (DuPont de Nemours, Wilmington, DE). The liquid compositions of the present disclosure may contain from 0 to 15 wt. %, or from 0.5 to 10 wt. %, or from 1 to 10 wt. %, or from 2 to 10 wt. % of an adhesion promoter based on the total weight of the composition.

Other suitable adhesion promoters include organo-phosphorous compounds that may or may not contain other heteroatoms. Such species are not particularly limited and are generally selected from the group consisting of organophosphorous compounds of P(III), P(V), and derivatives thereof.

Non-limiting examples of organophosphorus compounds of P(III) include phosphines ($PR_3$, including alkyldiaryl phosphines, bidentate alkyldiaryl-phosphines, bidentate triarylphosphines, dialkylarylphosphines, trialkylphosphines, triarylphosphines), aminophosphines ($PR_2(NR_2)$), phosphinites ($PR_2(OR)$), diaminophosphines ($PR(NR_2)_2$), phosphonamidites ($PR(OR)(NR_2)$, phosphonites ($PR(OR)_2$, including dialkylaryl phosphonites and bidentate aryl phosphonites), triamino-phosphines ($P(NR_2)_3$), phosphoro-diamidites ($P(OR)(NR_2)_2$), phosphoramidites ($P(OR)_2(NR_2)$, and phosphites ($P(OR)_3$, including triaryl phosphites and bidentate aryl phosphites). Generally, in these P(III) compounds, R is selected from the group consisting of hydrogen, a substituted or unsubstituted (C1-C30)alkyl, a substituted or unsubstituted (C2-C30)alkenyl, a substituted or unsubstituted (C5-C30)aryl, a substituted or unsubstituted 5- to 30-membered heteroaryl, or CN; or may be linked to an adjacent substituent to form a substituted or unsubstituted mono- or polycyclic, (C5-C30) alicyclic or aromatic ring, whose carbon atom(s) may be replaced with at least one heteroatom selected from nitrogen, oxygen, sulfur, Si, PO, SO, $SO_2$, and $SeO_2$.

In some non-limiting embodiments of organophosphorus compounds of P(III) at least one of R is a C1-C30 alkyl, in some embodiments all R's are C1-C30 alkyl groups.

Non-limiting examples of organophosphorus compounds of P(V) include phosphine oxides ($PR_3(O)$, including trialkyl phosphine oxides and triaryl phosphine oxides), phosphinates ($PR_2(O)(OR)$, including aryl phosphinic acids and dialkyl phosphinic acids), phosphinamides ($PR_2(O)(NR_2)$), phosphonates ($PR(O)(OR)_2$, including trialkyl phosphonates, triaryl phosphonates, and dialkylaryl phosphonates), phosphonamidates ($PR(O)(OR)(NR_2)$), phosphonamides ($PR(O)(NR_2)_2$), phosphates ($P(O)(OR)_3$, including alkyl phosphoric acids), phosphoramidates ($P(O)(OR)_2(NR_2)$), phosphorodiamidates ($P(O)(OR)(NR_2)_2$), and phosphoramides ($P(O)(NR_2)_3$). Generally, in these P(V) compounds R is the same or different at each occurrence and selected from the group consisting of hydrogen, a substituted or unsubstituted (C1-C30)alkyl, a substituted or unsubstituted (C2-C30)alkenyl, a substituted or unsubstituted (C5-C30) aryl, a substituted or unsubstituted 5- to 30-membered heteroaryl, or CN; or may be linked to an adjacent substituent to form a substituted or unsubstituted mono- or polycyclic, (C5-C30) alicyclic or aromatic ring, whose carbon atom(s) may be replaced with at least one heteroatom selected from nitrogen, oxygen, sulfur, Si, PO, SO, $SO_2$, and $SeO_2$.

In some non-limiting embodiments of organophosphorus compounds of P(V) at least one of R is a C1-C30 alkyl, in some embodiments all R's are C1-C30 alkyl. In some non-limiting embodiments, the organo-phosphorous compounds may be phosphate ester amide compounds such as SP670 and SP703 (Shikoku Chemicals Corporation), phosphazene compounds such as SPB-100, SPV-100 and SPE-100 (Otsuka Chemical Co., Ltd.), and FP-series (FUSHIMI Pharmaceutical Co., Ltd.). Potentially useful metal hydroxides include magnesium hydroxide such as UD65, UD650, and UD653 (Ube Material Industries, Ltd.), and aluminum hydroxide such as B-30, B-325, B-315, B-308, B-303, and UFH-20 (Tomoe Engineering Co., Ltd.).

Preferred adhesion promoters can include those capable of crosslinking to one or more components of the disclosed coating formulations. Such adhesion promoters include one or more functional groups selected from the group consisting of vinyl, styryl, maleimide, acrylic, methacrylic, allylic, alkynyl or the functional equivalent.

Any suitable flexibilizing agent or plasticizer may be used in the liquid compositions of the present disclosure and the selection of such is well within the ability of those skilled in the art. Exemplary flexibilizing agents include, but are not limited to, BMI 689 (Designer Molecules), diallyl phthalate and isomers, hexane diol diacrylate and other suitable materials that are liquid at a temperature of 25° C. A flexibilizing agent is used from 0-20 wt. %, or from 2-10 wt. %, or from 3-5% of the total non-volatile weight of the composition.

Any suitable flame retardant may be used in the liquid compositions of the present disclosure and the selection of such is well within the ability of those skilled in the art. Examples of the flame retardant may include an organic phosphorus-based flame retardant, an organic nitrogen-containing phosphorus compound, a nitrogen compound, a silicone-based flame retardant, and metal hydroxide. The organic phosphorus-based flame retardant may be a phenanthrene type phosphorus compound such as HCA, HCA-HQ, and HCA-NQ (SANKO CO., LTD.), a phosphorus-containing benzoxazine compound such as HFB-2006M (Showa High Polymer Co., Ltd.), a phosphate ester compound such as REOFOS 30, 50, 65, 90, 110, TPP, RPD, BAPP, CPD, TCP, TXP, TBP, TOP, KP140, and TIBP (Ajinomoto Fine-Techno Co., Inc.), TPPO and PPQ (HOKKO CHEMICAL INDUSTRY CO., LTD.), OP930 (Clariant Ltd.), and PX200 (DAIHACHI CHEMICAL INDUSTRY CO., LTD.), a phosphorus-containing epoxy resin such as FX289, FX305, and TX0712 (Tohto Kasei Co., Ltd.), a phosphorus-containing phenoxy resin such as ERF001 (Tohto Kasei Co., Ltd.), and a phosphorus-containing epoxy resin such as YL7613 (Japan Epoxy Resin Co., Ltd.).

The organic nitrogen-containing phosphorus compound may be a phosphate ester amide compound such as SP670 and SP703 (Shikoku Chemicals Corporation), a phosphazene compound such as SPB-100, SPV-100 and SPE-100 (Otsuka Chemical Co., Ltd.), and FP-series (FUSHIMI Pharmaceutical Co., Ltd.). Metal hydroxide may be magnesium hydroxide such as UD65, UD650, and UD653 (Ube Material Industries, Ltd.), and aluminum hydroxide such as B-30, B-325, B-315, B-308, B-303, and UFH-20 (Tomoe Engineering Co., Ltd.).

In some non-limiting embodiments, the content of the flame retardant is 0.5 to 10% by weight, and in some non-limiting embodiments 1 to 5% by weight, relative to 100% by weight of non-volatile components in the resin composition.

Any suitable surface leveling agent or 'leveling agent' may be used in the liquid compositions of the present disclosure and the selection of such is well within the ability of those skilled in the art. The leveling agent may contain a majority of silicone units derived from the polymerization of the following monomers $Si(R^1)(R^2)(OR^3)_2$ wherein $R^1$, $R^2$ or $R^3$ is each independently chosen from a $C_1$-$C_{20}$ alkyl or a $C_5$-$C_{20}$ aliphatic group or a $C_1$-$C_{20}$ aryl group. In one non-limiting embodiment, the leveling agent is non-ionic and may contain at least two functional groups that can chemically react with functional groups contained in the silicon and non-silicon resins under a cationic photo curing process or thermal curing condition. A leveling agent containing non-reactive groups is present in some non-limiting embodiments. In addition to silicon-derived units the leveling agent may comprise units derived from the polymerization of an $C_3$-$C_{20}$ aliphatic molecule comprising an oxirane ring. In addition, the leveling agent may comprise units derived from an $C_1$-$C_{50}$ aliphatic molecule comprising a hydroxyl group. In some non-limiting embodiments, the leveling agent is free of halogen substituents. In some non-limiting embodiments, the molecular structure of the leveling agent is predominantly linear, branched, or hyperbranched, or it may be a graft structure.

In some non-limiting embodiments; the leveling agent is selected from the group consisting of, AD1700, MD700; Megaface F-114, F-251, F-253, F-281, F-410, F-430, F-477, F-510, F-551, F-552, F-553, F-554, F-555, F-556, F-557, F-558, F-559, F-560, F-561, F-562, F-563, F-565, F-568, F-569, F-570, F-574, F-575, F-576, R-40, R-40-LM, R-41, R-94, RS-56, RS-72-K, RS-75, RS-76-E, RS-76-NS, RS-78, RS-90, DS-21 (DIC Sun Chemical); KY-164, KY-108, KY-1200, KY-1203 (Shin Etsu); Dowsil 14, Dowsil 11, Dowsil 54, Dowsil 57, Dowsil FZ2110, FZ-2123; Xiameter OFX-0077; ECOSURF EH-3, EH-6, EH-9, EH-14, SA-4, SA-7, SA-9, SA-15; Tergitol 15-S-3, 15-S-5, 15-S-7, 15-S-9, 15-S-12, 15-S-15, 15-S-20, 15-S-30, 15-S-40, L61, L-62, L-64, L-81, L-101, XD, XDLW, XH, XJ, TMN-3, TMN-6, TMN-10, TMN-100X, NP-4, NP-6, NP-7, NP-8, NP-9, NP-9.5, NP-10, NP-11, NP-12, NP-13, NP-15, NP-30, NP-40, NP-50, NP-70; Triton CF-10, CF-21, CF-32, CF76, CF87, DF-12, DF-16, DF-20, GR-7M, BG-10, CG-50, CG-110, CG-425, CG-600, CG-650, CA, N-57, X-207, HW 1000, RW-20, RW-50, RW-150, X-15, X-35, X-45, X-114, X-100, X-102, X-165, X-305, X-405, X-705; PT250, PT700, PT3000, P425, P1000 TB, P1200, P2000, P4000, 15-200 (Dow Chemical); DC ADDITIVE 3, 7, 11, 14, 28, 29, 54, 56, 57, 62, 65, 67, 71, 74, 76, 163 (Dow Silicones); TEGO Flow 425, Flow 370, Glide 100, Glide 410, Glide 415, Glide 435, Glide 432, Glide 440, Glide 450, Flow 425, Wet 270, Wet 500, Rad 2010, Rad 2200 N, Rad 2011, Rad 2250, Rad 2500, Rad 2700, Dispers 670, Dispers 653, Dispers 656, Airex 962, Airex 990, Airex 936, Airex 910 (Evonik); BYK-300, BYK-301/302, BYK-306, BYK-307, BYK-310, BYK-315, BYK-313, BYK-320, BYK-322, BYK-323, BYK-325, BYK-330, BYK-331, BYK-333, BYK-337, BYK-341, BYK-342, BYK-344, BYK-345/346, BYK-347, BYK-348, BYK-349, BYK-370, BYK-375, BYK-377, BYK-378, BYK-UV3500, BYK-UV3510, BYK-UV3570, BYK-3550, BYK-SILCLEAN 3700, Modaflow® 9200, Modaflow® 2100, Modaflow® Lambda, Modaflow® Epsilon, Modaflow® Resin, Efka FL, Additol XL 480, Additol XW 6580, and BYK-SILCLEAN 3720.

In some non-limiting embodiments, the leveling agent can be present in an amount of from 0 to 1 wt %, or from 0.001 to 0.9 wt %, or from 0.05 to 0.5 wt %, or from 0.05 to 0.25 wt %, or from 0.05 to 0.2 wt %, or from 0.1 to 0.15 wt %.

Photolithographic liquid compositions of the present disclosure may be prepared by combining one or more polymers of the present disclosure, any organic solvents, water or additional components and a photoactive compound as a curing agent in any order. The organic solvents are the same as those described above. When the present compositions contain the photoactive compound, such as a diazonaphthoquinone, an onium salt or photoinitiator, it is preferred that the curing agent is first dissolved in a suitable organic solvent or aqueous alkali, then combined with one or more present polymers and any optional surfactant, and then combined with any optional adhesion promoter. Selection of a suitable photoactive compound is within the ordinary level of skill in the art.

In some non-limiting embodiments, the liquid compositions of the present disclosure may be coated or deposited on a substrate by any suitable method. The substrates are the same as those described above. Suitable methods for coating the present compositions can include, but are not limited to, spin-coating, curtain coating, spray coating, roller coating, dip coating, vapor deposition, and lamination such as vacuum lamination and hot roll lamination, among other methods. In the semiconductor manufacturing industry, spin-coating is a preferred method to take advantage of existing equipment and processes. In spin-coating, the solids content of the composition may be adjusted, along with the spin speed, to achieve a desired thickness of the composition on the surface to which it is applied.

When the liquid compositions of the present disclosure do not contain an adhesion promoter, the surface of the substrate to be coated with the present compositions may optionally first be contacted with a suitable adhesion promoter or vapor treated. Various vapor treatments known in the art may increase the adhesion of the polymers of the present disclosure to the substrate surface, such as plasma treatments. In certain applications, it may be preferred to use an adhesion promoter to treat the substrate surface prior to coating the surface with the present compositions. The adhesion promoter is the same as those described above.

Typically, the liquid compositions of the present disclosure are spin-coated at a spin speed of 400 to 4000 rpm. The amount of the present compositions dispensed on the wafer or substrate depends on the total solids content in the composition, the desired thickness of the resulting layer, and other factors well-known to those skilled in the art. When a film or layer of the present compositions is cast by spin-coating, much (or all) of the solvent evaporates during deposition of the film. Preferably, after being disposed on a surface, the composition is heated (soft-baked) to remove any remaining solvent. Typical baking temperatures are from 90 to 120° C., although other temperatures may be suitably used. Such baking to remove residual solvent is typically done for approximately one or two minutes, although longer or shorter times may suitably be used.

The resin compositions of the present disclosure are typically cured by heating for a period of time. Suitable curing temperatures range from 140 to 300° C.; or from 170 to 250° C. Typically curing times range from 1 to 600 minutes, or from 30 to 240 minutes, or from 30 to 120 minutes.

Generally, the thickness of the formed resin composition layer is equal to or more than the thickness of the conductive layer. Since the thickness of the conductive layer in the circuit substrate is generally within a range of 5-70 μm, the resin composition layer generally has a thickness of 10-100 μm. In one embodiment, the liquid compositions comprising the polymer described herein can be spin cast onto copper foils. In some non-limiting embodiments the result is a surface treated copper foil wherein at least one surface of the surface treated copper foil comprises a resin composition from a mixture comprising: (a) 30-80 weight % of at least one thermosetting resin; (b) 20-70 weight % of at least one soluble polyimide resin; and optionally (c) 50-72 weight % of one or more inorganic particular fillers; and (d) 2-25 weight % of one or more crosslinkers; wherein the weight %'s provided are in terms of the total non-volatile components in the composition.

Copper foils include rolled annealed (RA) copper foils and electrodeposited (ED) copper foils. Because these foils are manufactured using a variety of methods, they may differ from each other in terms of mechanical properties, flexibility, and required copper roughing treatment. Generally, an ED copper foil has a matte surface (deposit surface) and a shiny surface (drum surface); whereas a RA copper foil has both surfaces being smooth. As the present copper foils are intended for use in flexible copper-clad laminates (FCCLs) and flexible printed circuit boards (FPCBs) for high frequency and/or high speed applications, suitable copper foils are surface-treated copper foils that are derived from raw copper foils that have been subjected to conventional surface treatments at least on one of their surfaces.

When a copper foil is incorporated into a flexible copper-clad laminate, the side of the copper foil facing toward a dielectric layer is referred as the "lamination side". The opposite side of the "lamination side" is referred as the "resist side". Provided that the present surface-treated copper foil has only one treated surface, then the treated surface becomes the lamination side when it is incorporated into a flexible copper-clad laminate.

By controlling current density, and/or plating time, and/or temperature of plating bath, and/or additives of plating solution, the surface-treated copper foil may have different grain size, surface roughness, and thickness.

In some non-limiting embodiments, the copper foils used herein are selected from the group consisting of Mitsui MT 18FL (1.5 μm with 18 μm carrier), BF—NN—HT, BFL-NN-HT, BFL-NN-Z, etc.

In some non-limiting embodiments of the invention, the present surface-treated copper foil preferably has a cross-sectional average grain size of 2.5 μm or less, or 2.0 μm or less.

From the viewpoint of ensuring proper adhesion without increasing the conductor loss, the at least one treated surface of the surface-treated copper foil has a surface roughness (Sz, ten-point mean roughness) of 2.5 μm or less, or 2.0 μm or less, as measured by a laser microscope. The surface roughness (Sz) is measured by using a laser microscope according to ISO 25178.

The lamination side and/or the resist side of the present surface-treated copper may be implemented with a nodulation layer, a passivation layer, and/or an adhesion-promotion layer to enhance the adaptability of copper foil for use in FPCs. The surface properties of the resist side of the surface-treated copper foil are subject to many subsequent printed circuit fabrication processes such as micro-etch, acid rinse, brown oxide, black oxide, pre-solder-mask treatment, etc. It follows that the surface roughness, nodule density, and total amount of the non-copper metal elements are criteria for the lamination side of the present surface-treated copper foil. In some non-limiting embodiments, the at least one treated surface of the surface-treated copper foil comprises a nodulation layer having a nodule density of 300 or less pieces/25 $m^2$; or 200 or less pieces/25 $\mu m^2$; or 100 or less pieces/25 $\mu m^2$; or 50 or less pieces/25 $\mu m^2$.

After the nodule electrodeposition treatment, one or more passivation treatments can be applied on one or both surfaces of the copper foil to provide additional desired properties such as anti-tarnishing, thermal resistance, and chemical resistance, etc. The passivation layers generally include non-copper metal elements such as zinc, nickel, chromium, cobalt, molybdenum, tungsten, and combinations thereof.

When the present surface-treated copper foil is incorporated into a flexible copper-clad laminate, the adhesion between the copper foil and the dielectric layer consists of a mechanical adhesion from the roughness of the copper foil but also a chemical bond from the adhesion promoter, if the adhesion-promotion layer is present. Generally, the final surface treatment is to form an adhesion-promotion layer by treating with a known adhesion promotor such as a phosphorous- or silane-based coupling agent, and the like. After completion of the adhesion-promotor treatment, moisture can be removed by an electric heater to obtain the surface-treated copper foils of the invention.

In another non-limiting embodiment, the compositions disclosed herein can be cast via a slot die coater or other suitable apparatus to form a dry film desirable for microelectronic applications. The cast films can be soft baked to remove residual solvent for 30 seconds to 10 minutes at temperatures of 70-150° C., or of 90-120° C. The soft baked film can then be subjected to a curing condition of 150-250° C. for 30 minutes to 4 hours.

In other non-limiting embodiments, layers of the liquid compositions of the present disclosure may also be formed as a dry film coated onto a carrier layer body such as polyethylene terephthalate (PET), and a protective sheet such as polyethylene (PE) or polypropylene (PP). The protective sheet can be removed and the dry film with carrier layer body can be disposed on the surface of a substrate by lamination. In lamination-based processes when the adhesive film has a protective film with thickness between 1-40 μm; the protective film is first removed, then the adhesive film and the circuit substrate are preheated, if desired, and the adhesive film is compression-bonded to the circuit substrate while pressing and heating. In some non-limiting embodiments, there is suitably adopted a method in which the adhesive film is laminated on the circuit substrate under reduced pressure by a vacuum lamination method. Non-limiting lamination conditions can include: a compression bonding temperature (lamination temperature) of 70-140° C., a compression bonding pressure of 1-11 $kgf/cm^2$ ($9.8\times 10^4$-$107.9\times 10^4$ $N/m^2$), and a reduced pressure of 20 mmHg (26.7 hPa) or less in terms of a pneumatic pressure. The lamination method may be batch- or continuous-mode using rolls. The vacuum lamination can be performed using a commercially available vacuum laminator. Examples of the commercially available vacuum laminator include a vacuum applicator manufactured by Nichigo-Morton Co., Ltd., a vacuum pressure laminator manufactured by Meiki Co., Ltd., a roll type dry coater manufactured by Hitachi Industries Co., Ltd., and a vacuum laminator manufactured by Hitachi AIC Inc.

The lamination step of performing heating and pressing under reduced pressure can be carried out using a general vacuum hot press machine. For example, the lamination step can be carried out by pressing a metal plate such as a heated SUS plate from a support layer side. Lamination is generally done under a reduced pressure of $1\times 10^{-2}$ MPa or less, and in some non-limiting embodiments $1\times 10^{-3}$ MPa or less. Although the heating and pressing can be performed in a single stage, it is generally advantageous to perform the heating and pressing separately by two or more stages so as to control bleeding of the resin. For example, the first-stage pressing may be performed at a temperature of 70-150° C. under a pressure of 1-15 $kgf/cm^2$ and the second-stage pressing may be performed at a temperature of 150-200° C. under a pressure of 1-40 $kgf/cm^2$. In some non-limiting embodiments, the pressing is performed at each stage for a period of 30-120 minutes. Examples of a commercially-available vacuum hot pressing machine include MNPC-V-750-5-200 (Meiki Co., Ltd.) and VH1-1603 (KITAGAWA SEIKI CO., LTD.).

The insulating layer can be formed on the circuit substrate by laminating the adhesive film on the circuit substrate, cooling the laminate to about room temperature, releasing the support in the case of releasing the support, and then thermally curing the resin composition layer. The appropriate condition for the thermal curing may be selected depending on the kind and content of each resin component in the resin compositions disclosed herein. In some non-limiting embodiments; the temperature and time for the thermal curing is selected from a range between 150-220° C. for 20-180 minutes, and in some non-limiting embodiments from a range between 160-210° C. for 30-120 minutes.

After forming the insulating layer, the support is then released in situations where the support had not been released before curing. Thereafter, the insulating layer formed on the circuit substrate is perforated as necessary to form a via hole or a through-hole. The perforation can be performed, for example, by a one or more methods known to those with skill in the art including drill, laser, plasma, or the like. In some non-limiting embodiments, perforation is achieved using a laser such as a carbon dioxide gas laser or a YAG laser.

Subsequently, the conductive layer is formed on the insulating layer by dry plating or wet plating. Non-limiting examples of dry plating methods include vapor deposition, sputtering, and ion plating. For wet plating, the surface of the insulating layer is sequentially subjected to a swelling treatment with a swelling solution, a roughening treatment with an oxidant, and a neutralization treatment with a neutralization solution to form convex-concave anchor. The swelling treatment with the swelling solution can be performed by immersing the insulating layer into the swelling solution at 50-80° C. for 5-20 minutes. Non-limiting examples of the swelling solution include an alkali solution and a surfactant solution. Examples of the alkali solution may include a sodium hydroxide solution and a potassium hydroxide solution. Commercially available swelling solution include Swelling Dip Securiganth P and Swelling Dip Securiganth SBU, (Atotech Japan K. K.). The roughening treatment with an oxidant can be performed by immersing the insulating layer into an oxidant solution at 60-80° C. for 10-30 minutes. Non-limiting examples of the oxidant include an alkaline permanganate solution in which potassium permanganate or sodium permanganate is dissolved in an aqueous solution of sodium hydroxide, dichromate, ozone, hydrogen peroxide/sulfuric acid, and nitric acid. The concentration of permanganate in an alkaline permanganate solution may be approximately 5 to 10% by weight. Examples of a commercially available oxidant include an alkaline permanganate solution such as Concentrate Compact CP and Dosing Solution Securiganth P (Atotech Japan K. K.). The neutralization treatment with a neutralization solution can be performed by immersing the insulating layer into the neutralization solution at 30-50° C. for 3-10 minutes. In some non-limiting examples, the neutralization solution can be an acidic aqueous solution. Examples of a commercially available neutralization solution include Reduction Solution Securiganth P (Atotech Japan K. K.).

The conductive layer may alternatively be formed by forming a plating resist with a reverse pattern of the conductive layer and performing only electroless plating. As a subsequent patterning method, a subtractive method or a semi-additive method may be used which are known to those skilled in the art.

The present disclosure is also directed to a multilayered printed wiring board, comprising an insulating layer which is formed of a resin comprising: (a) 2-20 wt. % of one or more thermosetting resins; (b) 1-25 wt. % of one or more soluble polyimide resins; (c) 0-25 wt. % of one or more additional resins; (d) 35-80 wt. % on one or more inorganic particulate fillers; (e) 5-45 wt. % of one or more crosslinkers; and (f) 0-15 wt. % of one or more adhesion promoters; wherein the wt. % ranges are with respect to the total non-volatile weight of the liquid composition and the one or more adhesion promoters are capable of functioning as a crosslinker with one or more components of the surface treatment; and a conductive layer formed by plating; wherein (a) through (f) are as disclosed elsewhere herein.

The present disclosure is also directed to a wide variety of electronic devices comprising at least one layer of the dielectric films of the present application on an electronic device substrate. The electronic device substrate can be any substrate for use in the manufacture of any electronic device. Exemplary electronic device substrates include, without limitation, semiconductor wafers, glass, sapphire, silicate materials, silicon nitride materials, silicon carbide materials, display device substrates, epoxy mold compound wafers, circuit board substrates, and thermally stable polymers.

EXAMPLES

Materials:

Monomers and other components were acquired/prepared as follows: β-myrcene (Vigon), styrene (Sigma Aldrich), vinyl toluene isomeric mixture and para isomer mixture (Deltech Corporation), Vazo 65 initiator (Wako Chemical), dibenzyl trithiocarbonate (BM1361 from Boron Molecular), 4-vinyl pyridine (Vertellus, used as received), bismaleimide BMI-689 (Designer Molecules), SPV-100 (Otsuka Chemical Company, used as received), spherical silica with average particle diameter of 0.5 μm (SC2050-MTM, propyl methacrylate ligand treatment and 5SM-CM4, octyl methacrylate ligand treatment, from Admatechs Company Limited, used as received). Vinyl phenoxy BCB [1-(4-vinylphenoxy)benzocyclobutene)] was prepared according to US Pat. Application No. 20190169327A1, the entire contents of which are incorporated herein by reference. Biphenyl maleimide resin MIR-3000 was received from Nippon Kayaku Company Limited. Dially bisphenol-A H126 and cyanate esters AroCy L-10, M-10 and XUS-371 were received from Huntsman Corporation. Polybutadiene diacrylate BAC45 was received from Osaka Organic Chemical Industry Ltd. SA9000 polyphenyl oxide methacrylate terminated polymer was received from Saudi Basic Industries Corporation. CN9167 (urethane acrylate) and SR533 (triallyl isocyanurate) were received from Sartomer USA, LLC. Triallyl cyanurate was received from TCI America, Inc.

All diamines, dianhydrides and reagents for polyimide syntheses were obtained from TCI America, Inc. and Sigma Aldrich. (Di)anhydride, (di)amine, polyimide and related designations used in this disclosure include: 6FDA (4,4'-hexafluoroiso-propylidenebisphthalic dianhydride), BPDA (3,3',4,4'-biphenyl tetracarboxylic dianhydride), FDA (9,9'-bis(4-aminophenyl)fluorene), TFMB (2,2'-bis(trifluoromethyl) benzidine), BPADA (4,4'-bisphenol A dianhydride), APB-133 (1,3'-Bis (3-aminophenoxy) benzene), ODPA (4,4-oxydiphthalic anhydride), (4-ethynylaniline) (4-EA), (bis(3-aminopropyl) terminated poly(dimethyl-siloxane) (av Mn-2500)), DAMA (2,4-Diamino-6-diallylamino-1,3,5-triazine), 4AS (4-amino styrene), DMAC (dimethylacetamide), and PAA (polyamic acid). All other solvents and chemicals were received from Fisher Scientific and used as received without additional purification.

Copper foil 18 m thick was subjected to a roughening etch treatment MEC CZ8101 (a product of MEC Company Ltd.), to a roughness of 400 nm average as measured by optical microscope.

Molecular Weight Determination:

(1) Arylcyclobutenes and Other Non-Polyimide Resins:

Polymer samples were prepared as a 0.5 wt. % solution in tetrahydrofuran and filtered through a 0.2-micron Teflon filter. The mobile phase was 0.5% triethylamine, 5% methanol and 94.5% tetrahydrofuran. The columns used were Waters Styragel HR5E 7.8×300 mm column lot number 0051370931. Injection volume was 100 microliters and run time was 27 minutes. Molecular weight data is reported relative to polystyrene standards.

(2) Polyimide Resins:

A Waters Model Breeze™ including pump and injector was used for polyimide resin molecular weight measurements. The mobile phase consisted of dimethylacetamide with 0.1% (wt/v) lithium chloride and 0.025% (wt/v) para-toluenesulfonic acid. The separation columns were a set of two Shodex GPC KD806 styrene-divinylbenzene gel, one Waters Styragel HR 0.5, and one Waters Styragel HR1. The column temperature was 40° C., the flow rate was 1.0 ml/min, the detector was a 2414™ differential refractometer with a 10 microliter size cell from Waters. The sample concentration was 1.0 mg/ml and the sample injection volume was 0.100 ml. Molecular weight was determined by polystyrene standards.

Film Sample Preparation and Processing:

Formulation solutions were draw-down coated onto a PET substrate (NAN YA NV38G 38 μm thickness or Mitsubishi Polyester 2MDK-100, 36 μm thickness) via a steel bar with a 6-mil gap. Films were soft-baked at 115° C. for 3 minutes. Films were laminated onto a suitable substrate or to themselves via a Meiki (MVLP 500/600) Laminator using a first stage vacuum of approximately 2 hPa for 30 seconds, a temperature of 90° C. with a pressure of 0.95 MPa using a rubber contact for 60 seconds. Peel testing samples were prepared using: a first stage vacuum of approximately 2 hPa for 30 seconds, a temperature of 100° C. with a pressure of 0.95 MPa using a rubber contact for 60 seconds and a second stage with a steel plate using a pressure of 1.5 MPa temperature of 100° C. for 60 seconds. For freestanding film samples, samples were laminated to themselves samples were then cured in a BlueM oven at 130° C. for 30 minutes followed by 200° C. for one hour under nitrogen, less than 100 ppm of oxygen, on a silicon substrate. The specimens were then released and PET was removed, yielding free-standing film samples that could be cleaved into desirable dimensions for analysis.

Test Methods (1) Dielectric Properties:

The IPC test method TM-650 2.5.5.13 (Revised 01/07) was used to determine dielectric properties of free-standing films using copper split cylinder resonators machined such that they possessed an empty cavity frequency of 10 GHz each and a Keysight N5224A PNA network analyzer. The film geometry was such that the substrate extended beyond the diameter of the two cylindrical cavity sections. Although the dielectric substrate thickness can vary from 0.01 mm to 5.0 mm, a substrate thickness of 0.03 mm was used in these studies. Free-standing films were placed in the cavity of the split cylinder resonator and the resonant frequency and quality factor of the TE011 resonant mode were measured using the network analyzer. Relative permittivity (Dk) and loss tangent (Df) of the films were calculated from the TE011 resonant mode using custom software written in MATLAB.

(2) Thermomechanical and Gravimetric Analysis:

Free standing films were cleaved into 10 mm by 25 mm geometry and placed in a TA Instruments dynamic mechanical analyzer Q800 instrument at a strain rate of 0.06%, preload force of 1 newton, and a frequency of 1 hertz. The temperature was equilibrated at 50° C. then increased to 250° C. at a rate of 5° C. per minute. The glass transition temperature value was taken as the maximum value of the curve of tan 6. Thermomechanical analysis was performed on a TA Instruments Thermomechanical Analyzer Q400 in a tensile mode. Samples were heated at a rate of 5° C. to 200° C., then brought down to −50° C., then back up to 250° C. at the same rate. The coefficient of thermal expansion was determined to be the linear change in dimension from 25° C. to 150° C. in the last cycle.

Peel Testing

Peel Testing, 18 μm Copper Foil

Once copper foil samples had been cured, peel strips were scored on the coupon one centimeter wide with a suitable blade, then the copper strip was peeled off at a ninety-degree angle on an Intron tensile tester at a rate of 50 mm/min. The peel force value in kilogram force per centimeter was calculated. Values above 0.75 kgf/cm were considered excellent, while values below 0.4 kgf/cm were considered unacceptable for the embodiments disclosed herein.

Synthesis Example S1 (Arylcyclobutene Resin "RAFT 5 k")

The following monomers and solvent were added to a 20 L jacketed reactor with overhead stirring and heated to 75° C. under a nitrogen blanket: 3999.7 g 1-(4-vinylphenoxy) benzocyclobutene, 4653.8 g vinyl toluene, 331.9 g vinyl pyridine, 297.4 benzyl trithiocarbonate and 3850.9 g cyclopentanone. An initiator feed of 149.0 g V65 and 3571.0 g cyclopentanone was fed at a constant rate into the reactor for 20 hours, and temperature was held for an additional 3 hours before returning to 40° C. The solution was used directly in formulation examples. GPC Mn 4.7 k, Mw 7.9 k.

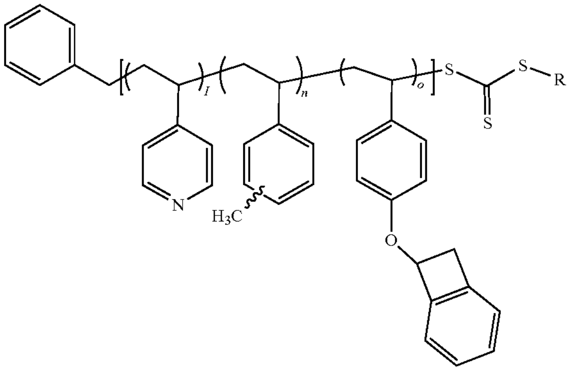

Synthesis Example S2 (Arylcyclobutene Resin "5G Polymer")

The following monomers and solvent were added to a 100 L jacketed reactor with overhead stirring and heat to 79° C. under a nitrogen blanket: 19695.8 g 1-(4-vinylphenoxy) benzocyclobutene, 15090.5 g vinyl toluene, 1517.7 g vinyl pyridine, 8445.6 g beta-myrcene and 19178.4 g cyclopentanone. An initiator feed of 1401.1 g V65 and 17131.5 g cyclopentanone was fed at a constant rate into the reactor for 20 hours, and temperature was held for an additional 3 hours before returning to 40° C. The solution was used directly in formulation examples. GPC Mn 7.4 k, Mw 33.5 k.

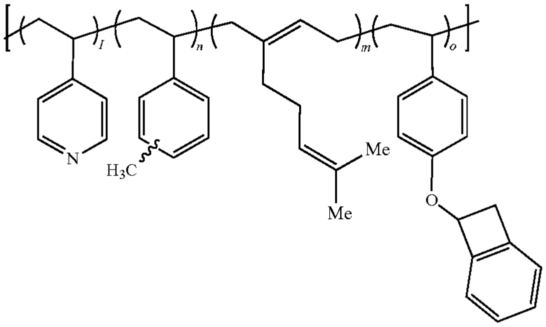

Synthesis Example S3

(Polyimide BPADA//APB-133/TFMB/4AS 100//42.5/42.5/30)

In a 1 L reaction flask equipped with a nitrogen inlet and outlet, mechanical stirrer, and thermocouple were charged 16.33 g (0.051 moles) of TFMB, 14.91 g (0.051 moles) of APB-133, 4.29 g (0.036 moles) of 4AS and 217 mL DMAC. The mixture was agitated under nitrogen at room temperature for about 30 minutes. Afterwards, 61.21 g (0.1176 moles) of BPADA was added slowly in portions to the stirring solution of the diamines. After completion of the dianhydride addition, and additional 24 mL of DMAC were used to wash in any remaining dianhydride powder from containers and the walls of the reaction flask. The resulting mixture was stirred for 24 hrs. Separately, a 5% solution of BPADA in DMAC was prepared and added in small amounts (ca. ~6.25 g) every 24 hours for 4 days. A total of 24.98 g of BPADA in DMAC solution was added. The resulting reaction was allowed to stir at room temperature under gentle agitation for additional 1-2 days. The imidization of the PAA took place by heating the solution to 40° C. followed by addition of 56.04 g of acetic anhydride and 51.12 g of 3-methylpyridine. The reaction mixture was then heated to 80° C. for 5-7 hours. After cooling to room temperature, the polymer solution was poured into 4 L MeOH in a blender and rapidly stirred to pulverize the polymer solid. The pulverized polymer solid was allowed to stir in the blender for 10 mins before collection by filtration. The polymer powder was air dried overnight and further dried under vac at 60° C. over 2 days. 91 grams amount of polymer was obtained. GPC Mn 10.5 k, Mw 21.9 k.

Synthesis Example S4

(Polyimide ODPA//TFMB/APB-133/DAMA/4AS 100//46.5/46.5/5/4)

S4 was synthesized in accordance with the same procedure was S3, except monomers ODPA//TFMB/APB-133/DAMA/4AS were used in the following ratio: 100//46.5/46.5/5/4. GPC Mn 15.3 k, Mw 37.6 k.

Synthesis Example S5

(Polyimide ODPA/6FDA//TFMB/Priamine™ 1075/4-AS 85/15//91/5/8)

S5 was synthesized in accordance with the same procedure was S3, except monomers ODPA/6FDA//TFMB/Priamine™ 1075/4-AS were used in the following ratio: 85/15//91/05/08. GPC Mn 26.0 k, Mw 75.1 k.

Synthesis Example S6

(Polyimide ODPA//APB-133/TFMB/DAMA/4-EA 100//46.5/46.5/5/4)

S6 was synthesized in accordance with the same procedure was S3, except monomers ODPA//APB-133/TFMB/DAMA/4-EA were used in the following ratio: 100//46.5/46.5/5/4. GPC Mn 11.8 k, Mw 35.9 k.

Synthesis Example S7

(Polyimide ODPA//APB-133/TFMB/M1309/4-AS 100//46/46/4/8)

S7 was synthesized in accordance with the same procedure was S3, except monomers ODPA//APB-133/TFMB/

M1309/4-AS were used in the following ratio: 100//46/46/4/8. GPC Mn 14.7 k, Mw 64.3 k.

Synthesis Example S8

(Polyimide BPADA//APB-133/4-AS 100//85/30)

S8 was synthesized in accordance with the same procedure was S3, except monomers BPADA//APB-133/4-AS were used in the following ratio: 100//85/30. GPC Mn 8.3 k, Mw 14.5 k.

Formulation and Film Preparation (1) Formulation and Film Example 1

4.7 parts of arylcyclobutene resin S1, 6.2 parts of polyimide S3, 20.2 parts of crosslinker MIR3000, and 69 parts of treated silica particles SC2050-MTM, all on a solid basis of the non-volatile components, were combined in a glass vial. Volatile components, 35.3 parts of methyl ethyl ketone, 22.4 parts of cyclopentanone and 1.8 parts of toluene were added. The contents were rolled overnight to homogenize the mixture, then film specimens were prepared as described above in the Materials section.

(2) Formulation and Film Examples 2-36 and Comparative Examples 1-5

Formulation and Film Examples 2-36 (Table 1) and Comparative Examples 1-5 (Table 2) were prepared using an analogous procedure to that described for Example 1 with the compositions as tabulated below. The corresponding film test data are presented in Tables 3 and 4.

TABLE 1

Formulation Non-Volatiles/Film Composition Examples

| Example | TS Resin[1] | Soluble PI Resin[2] | Crosslinker | Additional Resins[3] | Silica[4] |
|---|---|---|---|---|---|
| | Weight % | | | | |
| 1 | 4.7 | 6.2 S3 | 20.2 MIR3000 | | 69 SC2050-MTM |
| 2 | 4.7 | 6.2 S3 | 15.5 MIR3000 | 4.7 L-10 | 69 SC2050-MTM |
| 3 | 4.7 | 6.2 S3 | 18.6 MIR3000 | 1.6 BMI689 | 69 SC2050-MTM |
| 4 | 4.7 | 6.2 S3 | 15.5 MIR3000 | 2.3 BMI689<br>2.3 TAIC | 69 SC2050-MTM |
| 5 | 4.7 | 6.2 S3 | 15.5 MIR3000 | 4.7 M-10 | 69 SC2050-MTM |
| 6 | 4.7 | 6.2 S3 | 15.5 MIR3000 | 4.7 H126 | 69 SC2050-MTM |
| 7 | 10.9 | 6.2 S3 | 14.0 MIR3000 | | 69 SC2050-MTM |
| 8 | 7.8 | 6.2 S3 | 17.1 MIR3000 | | 69 SC2050-MTM |
| 9 | 3.1 | 6.2 S3 | 21.7 MIR3000 | | 69 SC2050-MTM |
| 10 | 18.6 | 6.2 S3 | 4.7 MIR3000 | 1.6 BAC45 | 69 SC2050-MTM |
| 11 | 4.7 | 6.2 S4 | 12.4 MIR3000 | 7.8 XUS-371 | 69 SC2050-MTM |
| 12 | 4.7 | 6.2 S4 | 15.5 MIR3000 | 4.7 L-10 | 69 SC2050-MTM |
| 13 | 4.7 | 6.2 S4 | 15.5 MIR3000 | 4.7 TAC | 69 SC2050-MTM |
| 14 | 4.7 | 6.2 S3 | 18.6 MIR3000 | 1.6 XUS-371 | 69 SC2050-MTM |
| 15 | 4.7 | 6.2 S3 | 12.4 MIR3000 | 7.8 XUS-371 | 69 SC2050-MTM |
| 16 | 4.7 | 6.2 S3 | 15.5 MIR3000 | 4.7 XUS-371 | 69 SC2050-MTM |
| 17 | 4.7 | 6.2 S5 | 15.5 MIR3000 | 4.7 XUS-371 | 69 SC2050-MTM |
| 18 | 5.5 | 1.6 S3 | 18.4 MIR3000 | 5.5 XUS-371 | 69 SC2050-MTM |
| 19 | 4.1 | 9.3 S3 | 13.6 MIR3000 | 4.1 XUS-371 | 69 SC2050-MTM |
| 20 | 4.7 | 6.2 S3 | 9.3 MIR3000 | 10.9 XUS-371 | 69 SC2050-MTM |
| 21 | 4.7 | 6.2 S3 | 15.5 MIR3000 | 4.7 TAIC | 69 SC2050-MTM |
| 22 | 4.7 | 6.2 S6 | 15.5 MIR3000 | 4.7 XUS-371 | 69 SC2050-MTM |
| 23 | 4.7 | 6.2 S7 | 15.5 MIR3000 | 4.7 XUS-371 | 69 SC2050-MTM |
| 24 | 4.7 | 6.2 S8 | 15.5 MIR3000 | 4.7 XUS-371 | 69 SC2050-MTM |
| 25 | 4.7 | 6.2 S3 | 15.5 MIR3000 | 4.7 DCP-M | 69 SC2050-MTM |
| 26 | 4.7 | 6.2 S3 | 15.5 MIR3000 | 4.7 TAIC | 69 5GX-CM1 |
| 27 | 4.7 | 6.2 S3 | 15.5 MIR3000 | 4.7 TAIC | 67 SC2050-MTM<br>2 5SP-CM1 |
| 28 | 5.0 | 6.6 S3 | 16.5 MIR3000 | 5.0 TAIC | 64 SC2050-MTM<br>3 Y50SC-AM1 |
| 29 | 4.7 | 6.2 S3 | 15.5 MIR3000 | 4.7 TAIC | 59 SC2050-MTM<br>10 K180SP-CM1 |
| 30 | 4.2 | 5.6 S3 | 14.0 MIR3000 | 4.2 TAIC | 72 SC2050-MTM |
| 31 | 3.8 | 5.0 S3 | 12.5 MIR3000 | 3.8 TAIC | 75 SC2050-MTM |
| 32 | 5.6 | 7.4 S3 | 18.5 MIR3000 | 5.6 TAIC | 63 SC2050-MTM |
| 33 | 4.7 | 6.2 S3 | 15.5 MIR5000 | 4.7 TAIC | 69 SC2050-MTM |
| 34 | 4.7 | 6.2 S3 | 15.5 BMI 4000 | 4.7 TAIC | 69 SC2050-MTM |
| 35 | 4.7 | 6.2 S3 | 15.5 BMI 5100 | 4.7 TAIC | 69 SC2050-MTM |
| 36 | 4.7 | 6.2 S3 | 15.5 BMI TMH | 4.7 TAIC | 69 SC2050-MTM |
| 37 | 4.65 | 6.2 S3 | 6.20 MIR3000<br>4.65 PEAM-645 | 7.13 TAIC<br>2.17 SPV100 | 69 SC2050-MTM |

[1]TS Resin is thermosetting resin: BCB Resin S1

[2]Soluble PI Resin—S3-S8 as described and prepared herein

[3]Additional Resin—L-10 is a cyanate ester, BMI689 is a bismaleimide, TAIC is triallyl isocyanurate, M-10 and XUS-371 are cyanate esters, H126 is diallyl bisphenol A, BAC45 is polybutadiene diacrylate, TAC is triallyl cyanurate, DCP-M is Kowa tricyclodecane dimethanol dimethacrylate, and XUS-371 is a cyanate ester, SPV100 is a phosphazene

[4]Silica SC2050-MTM is spherical silica with average particle diameter of 0.5 μm and propyl methacrylate ligand treatment, silica 5GX-CM1 is 0.5 μm avg diameter silica, treated with a propyl anhydride trimethoxy silane coupling agent, silica 5SP-CM1 is 0.3 μm avg diameter silica, treated with a phenyl trimethoxy silane coupling agent, and silica Y50SC-AM1 is 50 nm avg diameter silica treated with a vinyl trimethoxy silane coupling agent

TABLE 2

Formulation Non-Volatiles/Film Composition Comparative Examples

| | Weight % | | | | |
|---|---|---|---|---|---|
| Comparative Example | BCB Resin[1] | Second Resin[2] | Crosslinker | Additional Resins[3] | Silica[4] |
| 1 | 22.7 S2 | none | 5.6 MIR3000 | 2.2 SPV100 0.6 BMI689 | 69 5SM-CM4 |
| 2 | 4.7 S1 | 6.2 SA9000 | 10.9 MIR3000 | 9.3 BMI689 | 69 SC2050-MTM |
| 3 | 4.7 S1 | 6.2 BAC45 | 15.5 MIR3000 | 4.7 TAC | 69 SC2050-MTM |
| 4 | 4.7 S1 | 6.2 CN9167 | 15.5 MIR3000 | 4.7 XUS-371 | 69 SC2050-MTM |
| 5 | none | 6.2 S6 | 24.8 MIR3000 | none | 69 SC2050-MTM |

[1]BCB Resin: S1—arylcyclobutene resin "RAFT 5k" and S2—arylcyclobutene resin "5G Polymer"

[2]Second Resin—SA9000 is polyphenyl oxide methacrylate terminated polymer, BAC45 is is polybutadiene diacrylate, CN9167 is a urethane acrylate, and S6 is polyimide S6 as prepared above

[3]Additional Resin—SPV100 is a phosphazene, BMI689 is a is a bismaleimide, TAC is triallyl cyanurate, and XUS-371 is a cyanate ester

[4]Silica 5SM-CM4 is a spherical silica with average particle diameter of 0.5 μm and octyl methacrylate ligand treatment, and silica SC2050-MTM is spherical silica with average particle diameter of 0.5 μm and propyl methacrylate ligand treatment

TABLE 3

Film Test Data - Examples

| Example | CTE TMA (° C.) | DMA $T_g$ (° C.) | Dk 10 GHz | Df 10 GHz | Peel Test (kgf/cm) |
|---|---|---|---|---|---|
| 1 | 22 | 194 | 2.9 | 0.0015 | 0.86 |
| 2 | 21 | 208 | 3.1 | 0.0018 | 0.85 |
| 3 | 25 | 193 | 3.2 | 0.0015 | 0.75 |
| 4 | 25 | 195 | 3.1 | 0.0014 | 0.77 |
| 5 | 21 | 208 | 3.0 | 0.0019 | 0.58 |
| 6 | 27 | 170 | 3.3 | 0.0014 | 0.73 |
| 7 | 23 | 224 | ND | ND | 0.49 |
| 8 | 21 | 227 | ND | ND | 0.61 |
| 9 | ND | ND | ND | ND | 0.87 |
| 10 | 30 | 212 | 3.2 | 0.0016 | 0.42 |
| 11 | 18 | 225 | 3.1 | 0.003 | 0.95 |
| 12 | 18 | 209 | 3.0 | 0.0013 | 0.78 |
| 13 | 20 | 223 | 3.0 | 0.0013 | 0.66 |
| 14 | 22 | 208 | 3.5 | 0.0022 | 0.69 |
| 15 | 20 | 219 | 3.4 | 0.0032 | 0.81 |
| 16 | 18 | 219 | 3.0 | 0.0022 | 0.66 |
| 17 | 21 | 208 | 3.0 | 0.0033 | 0.91 |
| 18 | 20 | 217 | ND | ND | 0.71 |
| 19 | 20 | 216 | 3.3 | 0.0029 | 0.94 |
| 20 | 19 | 222 | ND | ND | 0.96 |
| 21 | 19 | 215 | 3.3 | 0.0011 | 0.78 |
| 22 | 18 | 222 | 3.0 | 0.0024 | 0.64 |
| 23 | 17 | 215 | 3.2 | 0.0017 | 0.71 |
| 24 | 21 | 213 | 3.0 | 0.001 | 0.78 |
| 25 | 19 | 240 | 3.2 | 0.0019 | 0.61 |
| 26 | 22 | ND | 2.9 | 0.002 | 0.24 |
| 27 | 22 | 204 | 3.6 | 0.0016 | 0.60 |
| 28 | 26 | 201 | 3.6 | 0.0018 | 0.56 |
| 29 | 24 | 211 | 3.4 | 0.0016 | 0.56 |
| 30 | 21 | 204 | 3.6 | 0.0018 | 0.66 |
| 31 | 17 | 192 | 3.3 | 0.0018 | 0.03 |
| 32 | 30 | 199 | 3.5 | 0.0017 | 0.62 |
| 33 | 29 | 194 | 3.3 | 0.0018 | 0.27 |
| 34 | 25 | 197 | 3.3 | 0.0019 | 0.54 |
| 35 | 27 | 182 | 3.5 | 0.0019 | 0.22 |
| 36 | 30 | 159 | 3.4 | 0.0016 | 0.43 |
| 37 | 15 | 212 | 3.1 | 0.0023 | 0.63 |

ND = Not Determined

TABLE 4

Film Test Data - Comparative Examples

| Comparative Example | CTE TMA (° C.) | DMA $T_g$ (° C.) | Dk 10 GHz | Df 10 GHz | Peel Test (kgf/cm) |
|---|---|---|---|---|---|
| 1 | 53 | 190 | 3.2 | 0.0015 | 0.40 |
| 2 | X | X | X | X | 0.51 |
| 3 | X | X | X | X | 0.81 |
| 4 | X | X | X | X | 1 |
| 5 | X | X | X | X | 0 |

X = property not measured; film failed during testing

The thermal, dielectric, and peel-strength properties exhibited by the resin compositions disclosed herein and reported in Table 3 herein generally make them useful for the intended electronics applications. This is particularly true versus the properties exhibited by Comparative Examples 1-5 reported in Table 4, where the Comparative Compositions lack one or more of the appropriate BCB and/or polyimide resins. Indeed a number of the Comparative Compositions were not able to generate films of sufficient quality to allow the intended measurements to be made in the context of the materials being developed. Also, certain formulations could be used to generate films with superior moisture uptake as measured by TGA-SA with a moisture uptake improvement of 65% (thermogravimetric analysis—sorption analysis). The observed effect can be as much as a 35% reduction in film moisture uptake for some of the compositions disclosed herein.

While there is some variability in the measured results (Table 3) for the target compositions, some of this might not be related to the performance of the compositions themselves. Factors such as the age or quality of the filler particles and/or the foils used can also impact the measured results. The results in Table 3 do demonstrate that, over a variety of compositions, the disclosed resin compositions do allow the generation of films with a useful combination of $D_f$, Tg, CTE, and peel strength. It can be surprising and unexpected to achieve the demonstrated balance of very high peel strength with very low Df and other properties as demonstrated herein.

(3) Formulation and Film Examples 41-46

Formulation and Film Examples 41-46 (Table 5) were prepared using an analogous procedure to that described for Example 1 with the compositions as tabulated below to demonstrate how the compositions of the formulations disclosed herein, particularly in terms of the type and amount of additional resin used, can impact peel measured peel strength (Table 6).

TABLE 5

| Formulation Non-Volatiles/Film Composition Examples | | | | | |
|---|---|---|---|---|---|
| | Weight % | | | | |
| Example | TS Resin(1) | Soluble PI Resin(2) | Crosslinker | Additional Resins(3) | Silica(4) |
| 41 | 4.65 | 6.20 S3 | 6.20 MIR3000 | 9.30 TAIC<br>4.65 PEAM-645 | 69 SC2050-MTM |
| 42 | 4.65 | 6.20 S3 | 6.20 MIR3000 | 7.13 TAIC<br>4.65 PEAM-645<br>2.17 SPV-100 | 69 SC2050-MTM |
| 43 | 4.65 | 6.20 S3 | 6.20 MIR3000 | 8.06 TAIC<br>4.65 PEAM-645<br>1.24 SPV-100 | 69 SC2050-MTM |
| 44 | 4.65 | 6.20 S3 | 6.20 MIR3000 | 7.13 TAIC<br>4.65 PEAM-645<br>2.17 SPV-100 | 69 SC2050-MTM |
| 45 | 4.65 | 6.20 S3 | 6.20 MIR3000 | 7.13 TAIC<br>4.65 PEAM-645<br>2.17 SPV-100 | 69 SC2050-MTM |
| 46 | 4.65 | 6.20 S3 | 6.20 MIR3000 | 7.13 TAIC<br>4.65 PEAM-645<br>3.10 SPV-100 | 69 SC2050-MTM |

(1)TS Resin is thermosetting resin: BCB Resin S1
(2)Soluble PI Resin—S3 as described and prepared herein
(3)Additional Resin—TAIC is triallyl isocyanurate, PEAM-645 is a polyester acrylate/methacrylate, SPV100 is a phosphazene
(4)Silica SC2050-MTM is spherical silica with average particle diameter of 0.5 μm and propyl methacrylate ligand treatment

TABLE 6

| Film Peel Test Data | |
|---|---|
| Example | Peel Test (kgf/cm) |
| 41 | 0.47 |
| 42 | 0.55 |
| 43 | 0.60 |
| 44 | 0.63 |
| 45 | 0.54 |
| 46 | 0.53 |

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

It is to be appreciated that certain features are, for clarity, described herein in the context of separate embodiments, may also be provided in combination in a single embodiment. Conversely, various features that are, for brevity, described in the context of a single embodiment, may also be provided separately or in any subcombination. The use of numerical values in the various ranges specified herein is stated as approximations as though the minimum and maximum values within the stated ranges were both being preceded by the word "about." In this manner, slight variations above and below the stated ranges can be used to achieve substantially the same results as values within the ranges. Also, the disclosure of these ranges is intended as a continuous range including every value between the minimum and maximum average values including fractional values that can result when some of components of one value are mixed with those of different value. Moreover, when broader and narrower ranges are disclosed, it is within the contemplation of this disclosure to match a minimum value from one range with a maximum value from another range and vice versa.

What is claimed is:

1. A composition comprising:

(a) 2-20 wt. % of one or more thermosetting resins;

(b) 1-25 wt. % of one or more soluble polyimide resins;

(c) 35-80 wt. % on one or more inorganic particulate fillers; and (d) 5-45 wt. % of one or more crosslinkers, wherein the wt. % ranges are with respect to the total solid weight of the composition, wherein the thermosetting resins comprise at least one arylcyclobutene resin;

and the soluble polyimide resins are prepared from aromatic tetracarboxylic acid dianhydrides selected from the group consisting of 3,3',4,4'-biphenyl tetracarboxylic dianhydride (BPDA), 4,4'-oxydiphthalic dianhydride (ODPA), 4,4'-bisphenol A dianhydride (BPADA) and 4,4'-(hexafluoro-isopropylidene) diphthalic anhydride (6FDA); and aromatic diamines selected from the group consisting of 2,2'-bis(trifluoromethyl) benzidine (TFMB) and 1,3-bis(3-aminophenoxy) benzene (APB-133).

2. The composition of claim 1, further comprising a solvent, wherein the solvent is 10-70 wt. % of the total composition.

3. The composition of claim 2, further comprising 0.5-10 wt. % of one or more adhesion promoters based on the total composition.

4. The composition of claim 3, wherein the one or more adhesion promoters is an organic nitrogen-containing phosphorous compound.

5. The composition of claim 3, further comprising one or more components selected from the group consisting of cyanate esters, allylic resins, butadiene resins, cyanurate, isocyanurate, and (meth)acrylate resins.

6. The composition of claim 5, wherein the one or more components comprises triallyl cyanurate and triallyl isocyanurate.

7. The composition of claim 6, wherein the triallyl cyanurate and triallyl isocyanurate are 5-30 wt. % of the total solid weight of the composition.

8. The composition of claim 7, wherein the triallyl cyanurate and triallyl isocyanurate are 20-30 wt. % of the total solid weight of the composition.

9. The composition of claim 2, wherein the one or more crosslinkers are maleimides.

10. The composition of claim 9, wherein the maleimides comprise one or more biphenyl groups.

11. The composition of claim 10, wherein the maleimides are 10-30 wt. % of the total solid weight of the composition.

12. The composition of claim 11, wherein the maleimides are 10-20 wt. % of the total solid weight of the composition.

13. The composition of claim 2, further comprising one or more additives selected from the group consisting of, organic fillers, plasticizers, adhesion promoters, metal passivating materials, flame retardants, and surface leveling agents.

14. A surface-treated metallic foil, wherein at least one surface of the surface-treated metallic foil comprises a surface treatment comprising the composition of claim 2.

* * * * *